US012793103B2

(12) United States Patent
Zhu et al.

(10) Patent No.: US 12,793,103 B2
(45) Date of Patent: Nov. 10, 2026

(54) ADVERTISEMENT DISPLAY METHOD AND RELATED DEVICE

(71) Applicant: Huawei Technologies Co., Ltd., Shenzhen (CN)

(72) Inventors: Zonglu Zhu, Nanjing (CN); Youqi Jin, Nanjing (CN); Chunhui Zhang, Nanjing (CN); Xiaoming Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 18/496,086

(22) Filed: Oct. 27, 2023

(65) Prior Publication Data

US 2024/0062249 A1 Feb. 22, 2024

Related U.S. Application Data

(63) Continuation of application No. PCT/CN2022/086308, filed on Apr. 12, 2022.

(30) Foreign Application Priority Data

Apr. 30, 2021 (CN) ......................... 202110486355.6

(51) Int. Cl.
*G06Q 30/0251* (2023.01)
*G06Q 30/0241* (2023.01)

(52) U.S. Cl.
CPC ..... *G06Q 30/0269* (2013.01); *G06Q 30/0277* (2013.01)

(58) Field of Classification Search
CPC ........... G06Q 30/0269; G06Q 30/0277; G06Q 30/0243; G06Q 30/0246; G06Q 30/0271
See application file for complete search history.

(56) References Cited

U.S. PATENT DOCUMENTS

| | | | | |
|---|---|---|---|---|
| 2005/0215238 | A1* | 9/2005 | Macaluso | G06Q 30/0267 455/406 |
| 2018/0240156 | A1* | 8/2018 | Shaw | G06Q 30/0276 |
| 2020/0175548 | A1 | 6/2020 | Li et al. | |
| 2020/0359076 | A1* | 11/2020 | Patel | H04N 21/2393 |
| 2022/0036399 | A1* | 2/2022 | Grover | G06Q 30/0243 |

FOREIGN PATENT DOCUMENTS

| | | |
|---|---|---|
| CN | 108235812 A | 6/2018 |
| CN | 110381346 A | 10/2019 |

* cited by examiner

*Primary Examiner* — Azam A Ansari
(74) *Attorney, Agent, or Firm* — Slater Matsil, LLP

(57) ABSTRACT

This application provides an advertisement display method and a related device. The method includes: A terminal device sends an advertisement request to an advertisement server; the terminal device receives a return message that is sent by the advertisement server in response to the advertisement request; the terminal device determines whether a second advertisement has been downloaded within preset time; and the terminal device displays the second advertisement if the terminal has downloaded the second advertisement within the preset time; or the terminal device displays a first advertisement if the terminal has not downloaded the second advertisement within the preset time.

18 Claims, 15 Drawing Sheets

FIG. 9B
Terminal device
China Mobile 4G
11:11
October 29 Wednesday
Weather
Browser
Player
Camera
sms
Phone
Contacts
SMS message
Gallery

TO FIG. 11B

CONT. FROM FIG. 11A

TO FIG. 12B

CONT. FROM FIG. 12A

ADVERTISEMENT DISPLAY METHOD AND RELATED DEVICE

CROSS-REFERENCE TO RELATED APPLICATIONS

This application is a continuation of International Application No. PCT/CN2022/086308, filed on Apr. 12, 2022, which claims priority to Chinese Patent Application No. 202110486355.6, filed on Apr. 30, 2021. The disclosures of the aforementioned applications are hereby incorporated by reference in their entireties.

TECHNICAL FIELD

This application relates to the communications field, and more specifically, to an advertisement display method and a related device.

BACKGROUND

Usually, an advertiser uploads, to an advertisement resource pool, an advertisement material that needs to be placed. The advertisement material may include a picture, a text, a video, a sound, an AR/VR, and the like of an advertisement. When a terminal detects that a user starts an application program or a specified interface of an application program is displayed, the terminal may send an advertisement request to an advertisement server. The advertisement server searches the advertisement resource pool for a target advertisement matching the advertisement request, and returns advertisement information to the terminal. The terminal may further obtain an advertisement material of the target advertisement from the advertisement server based on the advertisement information, and display the advertisement material of the target advertisement on a display interface of the terminal.

When the terminal downloads the advertisement material, the advertisement material may be downloaded slowly. For example, a picture, a video, or a sound included in the advertisement material occupies large space, or network quality during downloading is poor, or a timeout occurs when the advertisement server is requested. Consequently, the advertisement material cannot be downloaded or the advertisement material is downloaded slowly. Generally, media have a requirement on an advertisement display delay. For example, for a splash advertisement, most media control a delay of an entire process from requesting an advertisement to finally displaying the advertisement to be within 2 s. If the delay is excessively long, actual user experience is affected. If the delay of entire process exceeds 2 s, a media application is directly accessed. In this case, because the advertisement cannot be displayed in time, an advertisement exposure rate is affected.

SUMMARY

This application provides an advertisement display method. An advertisement server returns a best advertisement based on advertisement information preloaded on a terminal device, thereby improving advertisement placement efficiency.

According to a first aspect, an advertisement display method is provided. The method includes: A terminal device sends an advertisement request to an advertisement server, where the advertisement request includes a first advertisement information set, the first advertisement information set includes one or more pieces of first advertisement information, and an advertisement corresponding to the first advertisement information is an advertisement preloaded by the terminal device; the terminal device receives a return message that is sent by the advertisement server in response to the advertisement request, where the return message includes the first advertisement information and second advertisement information, and an advertisement corresponding to the second advertisement information is an advertisement that is not preloaded by the terminal device; the terminal device determines whether a second advertisement has been downloaded within preset time; and the terminal device displays the second advertisement if the terminal has downloaded the second advertisement within the preset time; or the terminal device displays the first advertisement if the terminal has not downloaded the second advertisement within the preset time.

According to the method provided in the first aspect, before the terminal device sends the advertisement request to the advertisement server, the terminal device sends an advertisement preloading request to the advertisement server. The terminal device receives second return message sent by the advertisement server. The return message includes a second advertisement information set. The second advertisement is an advertisement that needs to be preloaded in the terminal device. There are one or more second advertisements. The terminal device downloads a third advertisement based on third advertisement information.

In the method provided in the first aspect, the advertisement preloading request and the advertisement request each include one or more of the following parameters: a preloading identifier, an advertisement slot identifier, a device identifier, a user identifier, user behavior data, and the like.

The method provided in the first aspect further includes: The terminal device sends a second advertisement request to the advertisement server, where the advertisement request includes the first advertisement information set, the first advertisement information set includes one or more first advertisements, and the first advertisement is an advertisement preloaded by the terminal device; the terminal device receives a third return message that is sent by the advertisement server in response to the advertisement request, where the return message includes the first advertisement information; and the terminal displays a first advertisement material corresponding to the first advertisement.

In the method provided in the first aspect, the return message includes one or more of the following parameters: an advertisement material download link, an advertisement identifier, an advertisement name, a package name of an application program, and address information of the terminal device.

In the method provided in the first aspect, the terminal device sends the advertisement request to the advertisement server by invoking an advertisement SDK.

The method provided in the first aspect further includes: The terminal device obtains a first operation of a user, where the first operation is an operation of opening the application program or an operation of tapping a link in the application program.

According to the method provided in the first aspect, before that the terminal device downloads a third advertisement based on third advertisement information, the method further includes: The terminal device determines to connect to a network through Wi-Fi.

According to a method provided in a second aspect, an advertisement server receives an advertisement request sent by a terminal. The advertisement request includes a first advertisement information set. The first advertisement information set includes one or more pieces of first advertisement information. An advertisement corresponding to the first advertisement information is an advertisement preloaded by the terminal device. The advertisement server obtains a best advertisement in response to the advertisement request. If the first advertisement information set includes the best advertisement, a third return message is sent to the terminal device. The return message includes information about the best advertisement. If the first advertisement information set does not include the best advertisement, a spare advertisement is obtained from the first advertisement information set, and a return message is sent to the terminal device. The return message includes the information about the best advertisement and information about the spare advertisement.

The method provided in the second aspect further includes:

The advertisement server receives an advertisement preloading request sent by the terminal device; the advertisement server sends second return message to the terminal device, where the return message includes a second advertisement information set, a second advertisement is an advertisement that needs to be preloaded in the terminal device, and there are one or more second advertisements.

According to the method provided in the second aspect, the advertisement preloading request and the advertisement request each include one or more of the following parameters: a preloading identifier, an advertisement slot identifier, a device identifier, a user identifier, user behavior data, and the like.

According to the method provided in the second aspect, the server obtains the best advertisement based on at least one of the following parameters: the device identifier, the user identifier, and the user behavior data.

According to the method provided in the second aspect, the server obtains the second advertisement based on at least one of the following parameters: the device identifier, the user identifier, and the user behavior data.

According to a third aspect, a communication apparatus is provided. The communication apparatus includes a unit configured to perform steps in any one of the first aspect or the possible implementations of the first aspect.

According to a fourth aspect, a communication apparatus is provided. The communication apparatus includes at least one processor and a memory. The processor is coupled to the memory. The memory stores program instructions. When the program instructions stored in the memory are executed by the processor, the method according to any one of the first aspect or the possible implementations of the first aspect is performed.

According to a fifth aspect, a communication apparatus is provided. The communication apparatus includes at least one processor and an interface circuit. The at least one processor is configured to perform the method according to any one of the first aspect or the possible implementations of the first aspect.

According to a sixth aspect, a central device is provided. The central device includes any communication apparatus provided in the third aspect, the fourth aspect, or the fifth aspect.

According to a seventh aspect, a computer program product is provided. The computer program product includes a computer program. When being executed by a processor, the computer program is configured to perform the method according to any one of the first aspect or the possible implementations of the first aspect, or is configured to perform the method according to any one of the second aspect or the possible implementations of the second aspect.

According to an eighth aspect, a computer-readable storage medium is provided. The computer-readable storage medium stores a computer program. When being executed, the computer program is configured to perform the method according to any one of the first aspect or the possible implementations of the first aspect, or is configured to perform the method according to any one of the second aspect or the possible implementations of the second aspect.

According to a ninth aspect, a chip is provided. The chip includes a processor, configured to invoke a computer program from a memory and run the computer program, to enable a communication device on which the chip is installed to perform the method according to any one of the first aspect or the possible implementations of the first aspect, or perform the method according to any one of the second aspect or the possible implementations of the second aspect.

DETAILED DESCRIPTION OF ILLUSTRATIVE EMBODIMENTS

Figure 1:
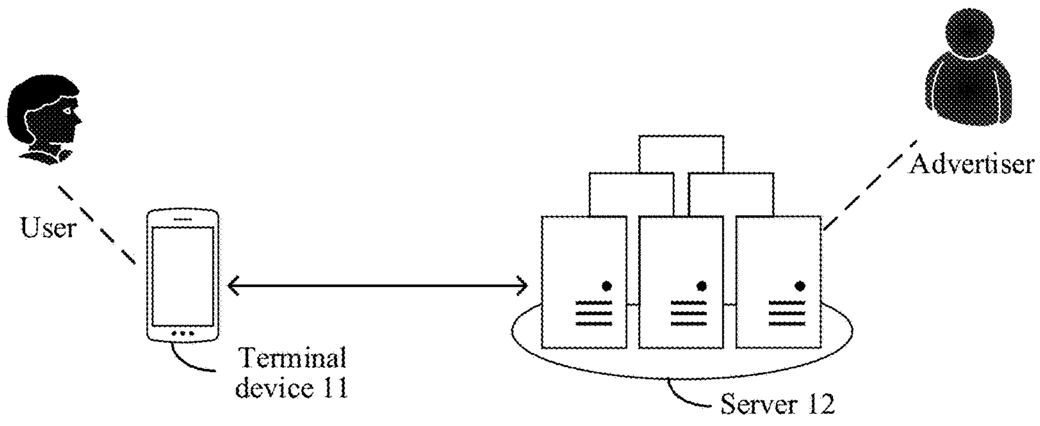
FIG. 1 is a schematic diagram of an example of an architecture of a communication system applicable to an embodiment of this application.

The following describes technical solutions of this application with reference to accompanying drawings.

In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the quantity of indicated technical features. Therefore, a feature limited by "first" or "second" may explicitly or implicitly include one or more features. In the descriptions of embodiments, unless otherwise specified, "a plurality of" means two or more.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain, and/or carry instructions and/or data.

The technical solution of embodiments of this application may be used in various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5th generation (5G) system or a new radio (NR) system.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain, and/or carry instructions and/or data.

In specific implementation, a terminal 11 may be a desktop computer, a laptop computer, a tablet computer, a handheld computer, a mobile phone, a notebook computer, an ultra-mobile personal computer (UMPC), a netbook, a cellular phone, a personal digital assistant (PDA), a dedicated media player, a consumer electronic device, a wearable device, an augmented reality (AR)/a virtual reality (VR) device, or the like.

A term "user interface (UI)" in the following embodiments of this application is a medium interface for interaction and information exchange between an application program or an operating system and a user, and implements conversion between an internal form of information and a form that can be accepted by the user. The user interface is source code written in a specific computer language such as Java or an extensible markup language (XML). Interface source code is parsed and rendered on an electronic device, and is finally presented as content that can be identified by the user. The user interface is generally represented in a form of a graphical user interface (GUI), and is a user interface that is related to a computer operation and that is displayed in a graphic manner. The user interface may be a visual interface element such as a text, an icon, a button, a menu, a tab, a text box, a dialog box, a status bar, a navigation bar, or a Widget that is displayed on a display screen of the electronic device.

An advertisement refers to information that is about a commodity or a service and that is spread through an application program by an advertiser to a user to improve a recognition degree and a brand image, promote a service, expand a product sales volume, and increase service revenues. The advertisement includes advertisement elements, and the advertisement elements include but are not limited to a picture, a video, an audio, a text, an AR, a VR, and the like.

An advertisement material ID (cacheContentId) is associated with an advertisement material. When the advertiser uploads an advertisement to an advertisement server, corresponding cacheContentId is allocated to the advertisement. In a subsequent advertisement allocation or request process, a corresponding advertisement material is associated through cacheContentId.

Advertisement SDK: The Software Development Kit (SDK) is a software development kit. The advertisement SDK provides advertisement-related functions, for example, requesting an advertisement from the advertisement server and providing capabilities such as advertisement display, tapping, and downloading. In some embodiments, an application program may directly integrate the advertisement SDK, to have these advertisement capabilities. In some other embodiments, a terminal device may integrate a system-level advertisement SDK. The advertisement SDK is a system module, and may provide an advertisement service for all application programs in an electronic device 100.

An advertisement resource pool is maintained in the server 12. The advertisement resource pool stores an advertisement material (for example, a text, a picture, a video, and a sound included in an advertisement) and advertisement information (for example, an advertisement type and a link address of the advertisement material) uploaded by the advertiser.

FIG. 1 is a schematic diagram of an example of an architecture of a communication system applicable to an embodiment of this application. As shown in FIG. 1, the communication system includes a terminal device 11 used by a user and an advertisement server 12. An advertiser may upload an advertisement to the advertisement server in advance. Data and information may be transmitted between the terminal device and the advertisement server through an LTE communication technology, a 5G communication technology, or the like. When an advertisement is requested, the terminal may send an advertisement request to the advertisement server after being triggered by the user. The advertisement server searches the advertisement resource pool for advertisement information (for example, an ID, a name, an advertisement type, and an advertisement material download link of a target advertisement) of the target advertisement that matches the advertisement request, and returns the advertisement information to the terminal. In this case, the terminal may further obtain the advertisement material of the target advertisement from the advertisement server based on the advertisement information. For example, the terminal downloads the advertisement material of the target advertisement based on the advertisement material download link in the advertisement information, and then displays the advertisement material of the target advertisement in a display interface of the terminal.

Figure 2:
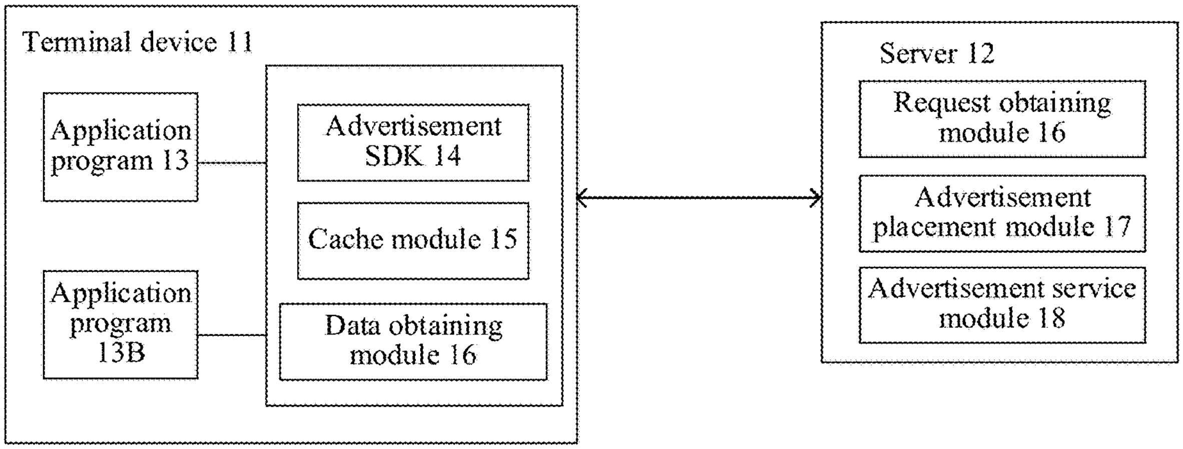
FIG. 2 is a schematic diagram of another example of an architecture of a communication system applicable to an embodiment of this application.

In an embodiment, as shown in FIG. 2, a plurality of application programs 13 are installed on the terminal device 11, and a system of the terminal provides an advertisement SDK 14, a cache module 15, a data obtaining module 16, and the like. These modules may be invoked by the plurality of application programs to provide an advertisement service function for the plurality of application programs. The advertisement SDK on the terminal device is mainly provided to an application program for integration, and provides services such as requesting, playing, and event reporting that are related to an advertisement. The cache module is configured to store a preloaded advertisement material, and may be a storage unit in an internal memory. A user behavior parameter or a device parameter that the data obtaining module is configured to obtain may be obtained by invoking an API of a device.

An advertisement server 12 includes a request obtaining module 16, an advertisement placement module 17, and an advertisement service module 18. The request obtaining module is configured to obtain an advertisement request of the terminal device, and extract valid advertisement information, for example, an advertisement type, a user behavior parameter, or a device parameter, from the advertisement request. The advertisement placement module may be used by the advertiser to place an advertisement based on an advertisement requirement of the advertiser, and store the advertisement placed by the advertiser in the server. The advertisement service module is configured to match the advertisement request of the terminal with an advertisement placement requirement of the advertiser, and send a corresponding advertisement to the terminal device.

Figure 3:
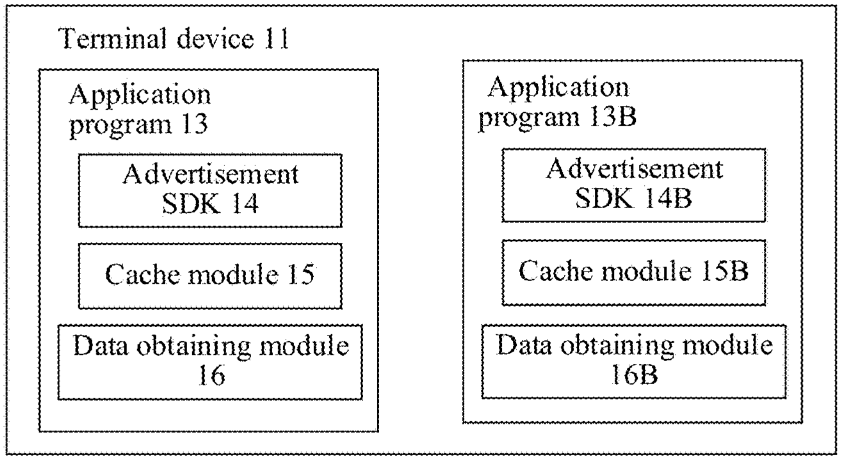
FIG. 3 is a schematic diagram of another example of an architecture of a communication system applicable to an embodiment of this application.

In another embodiment, as shown in FIG. 3, a plurality of application programs are installed on a terminal device, and an advertisement software development kit (SDK) module, a cache module, and a data obtaining module are integrated into each of the plurality of application programs. When a third-party application program, for example, a media application program, may directly integrate the advertisement SDK, the third-party application program has these advertisement capabilities.

Figure 4:
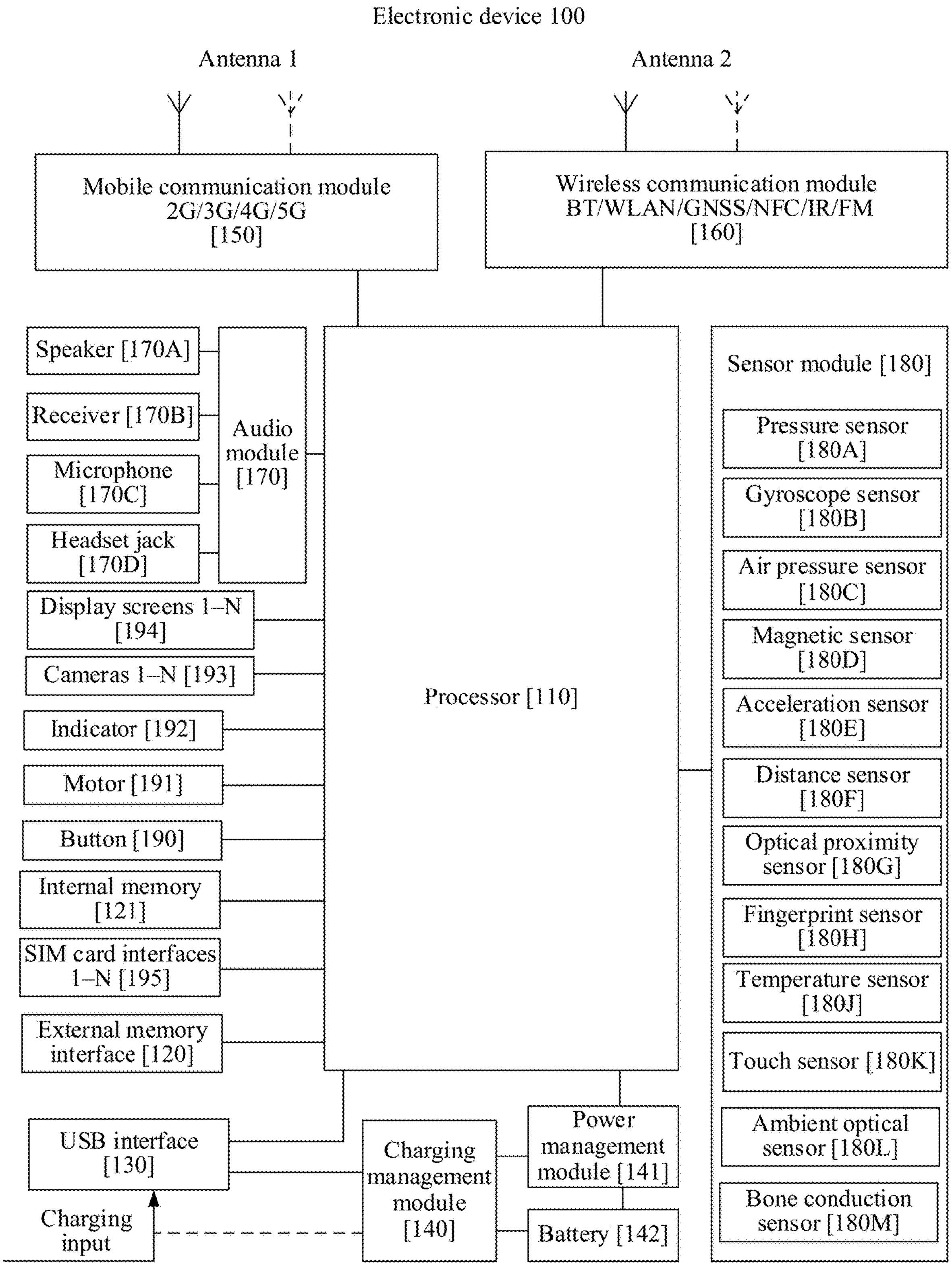
FIG. 4 is a schematic block diagram of an example of a communication structure according to an embodiment of this application.

As shown in FIG. 4, in an embodiment of this application, descriptions are provided by using an example in which the terminal 11 is the electronic device 100. It should be understood that the electronic device 100 shown in FIG. 4 is merely an example of the terminal, and the electronic device 100 may have more or fewer components than those shown in the figure, may combine two or more components, or may have different component configurations.

The electronic device 100 may be at least one of a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device, or a smart city device. A specific type of the electronic device 100 is not specially limited in embodiments of this application.

The electronic device 100 may include a processor 110, an external memory interface 120, an internal memory 121, a universal serial bus (USB) connector 130, a charging management module 140, a power management module 141, a battery 142, an antenna 1, an antenna 2, a mobile communication module 15*o*, a wireless communication module 160, an audio module 170, a speaker 170A, a receiver 170B, a microphone 170C, a headset jack 170D, a sensor module 180, a button 190, a motor 191, an indicator 192, a camera 193, and a display screen 194, a subscriber identity module (SIM) card interface 195, and the like. The sensor module 180 may include a pressure sensor 180A, a fingerprint sensor 180H, a touch sensor 180K, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The processor may generate an operation control signal based on an instruction operation code and a time sequence signal to complete control of instruction fetching and instruction execution.

A memory may be further disposed in the processor 110, and is configured to store instructions and data. In some embodiments, the memory in the processor 110 may be a cache. The memory may store instructions or data that has been used by the processor 110 or that is used frequently. When needing to use the instructions or the data, the processor 110 may directly invoke the instructions or the data from the memory. This avoids repeated access, reduces a wait time for the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The processor 110 may be connected to modules such as a touch sensor, an audio module, a wireless communication module, a display, and a camera through at least one of the foregoing interfaces.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The USB interface 130 is an interface complying with a USB standard specification, and may be configured to connect the electronic device 100 and a peripheral device, and may be specifically a Mini USB connector, a Micro USB connector, a USB Type-C connector, or the like. The USB connector 130 may be configured to connect to a charger, so that the charger charges the electronic device 100, or may be configured to connect to another electronic device, to implement data transmission between the electronic device 100 and the another electronic device, or may be configured to connect to a headset, and output, through the headset, an audio stored in the electronic device. The connector may be further configured to connect to another electronic device, for example, a VR device. In some embodiments, a universal serial bus standard specification may be USB 1.x, USB 2.0, USB 3.x, and USB 4.

The charging management module 140 is configured to receive a charging input of a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor. The amplified signal is converted into an electromagnetic wave and radiated out through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display screen 194. In some embodiments, the modem processor may be an independent component. In some other embodiments, the modem processor may be independent of the processor 110, and is disposed in a same device as the mobile communication module 150 or another functional module.

The wireless communication module 160 may provide a solution applied to the electronic device 100 for wireless communication including wireless local area networks (WLAN) (such as a wireless fidelity (Wi-Fi) network), Bluetooth (BT), Bluetooth low energy (BLE), ultra-wide-band (UWB), a global navigation satellite system (GNSS), frequency modulation (FM), near field communication technology (NFC), and an infrared (IR) technology. The wireless communication module 160 may be one or more components integrating at least one communication processor module. The wireless communication module 160 receives an electromagnetic wave through the antenna 2, performs frequency modulation and filtering processing on the electromagnetic wave signal, and sends the processed signal to the processor 110. The wireless communication module 160 may further receive a to-be-sent signal from the processor 110, and perform frequency modulation and amplification on the signal. The amplified signal is converted into an electromagnetic wave and radiated out through the antenna 2.

In some embodiments, the antenna 1 of the electronic device 100 is coupled to the mobile communication module 150, and the antenna 2 is coupled to the wireless communication module 160, so that the electronic device 100 can communicate with a network and another electronic device through a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 may implement a display function through the GPU, the display screen 194, the application processor, and the like. The GPU is a microprocessor for image processing, and is connected to the display screen 194 and the application processor. The GPU is configured to perform mathematical and geometric computation for graphics rendering. The processor 110 may include one or more GPUs, which execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device 100 may include one or more display screens 194.

The electronic device 100 may implement a photographing function through the camera 193, the ISP, the video codec, the GPU, the display screen 194, the application processor AP, the neural-network processor NPU, and the like.

The digital signal processor is configured to process a digital signal, and may further process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card, or files such as music and videos are transferred from an electronic device to an external storage card.

The internal memory 121 may be configured to store computer executable program code. The executable program code includes instructions. The internal memory 121 may include a program storage area and a data storage area. The program storage area may store an operating system, an application program required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various function methods or data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may play music through the speaker 170A, or output a hands-free audio signal.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, capacitance between electrodes changes. The electronic device 100 determines pressure intensity based on the change in the capacitance. When a touch operation is performed on the display screen 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for newly creating an SMS message is performed.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The touch sensor 180K is also referred to as a "touch component". The touch sensor 180K may be disposed on the display screen 194, and the touch sensor 180K and the display screen 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display screen 194. In some other embodiments, the touch sensor 180K may also be disposed on a surface of the electronic device 100 at a location different from that of the display screen 194.

The button 190 may include a power button, a volume button, and the like. The button 190 may be a mechanical button, or may be a touch button. The electronic device 100 may receive a button input, and generate a key signal input related to a user setting and function control of the electronic device 100.

In some embodiments of this application, that a terminal device requests an advertisement may be divided into two processes: preloading the advertisement by the terminal and requesting the advertisement by the terminal. Specifically, the preloading the advertisement by the terminal and the requesting the advertisement by the terminal in real time may be two independent processes. The advertisement preloaded by the terminal is an advertisement material that is pre-extracted and cached in a storage unit. In practice, after a user downloads an advertisement material, the advertisement material is displayed after long time (which needs triggering of an advertisement request), or the user may not request to display the advertisement material at all. An advertisement request stage of the terminal may be a process of requesting a to-be-displayed advertisement from a server after receiving a user trigger, and displaying the advertisement on the terminal.

In some of the following embodiments, steps at a stage of preloading an advertisement by the terminal are similar. For details, refer to the following descriptions.

Stage 1: Stage of Preloading an Advertisement by the Terminal

Figure 5:
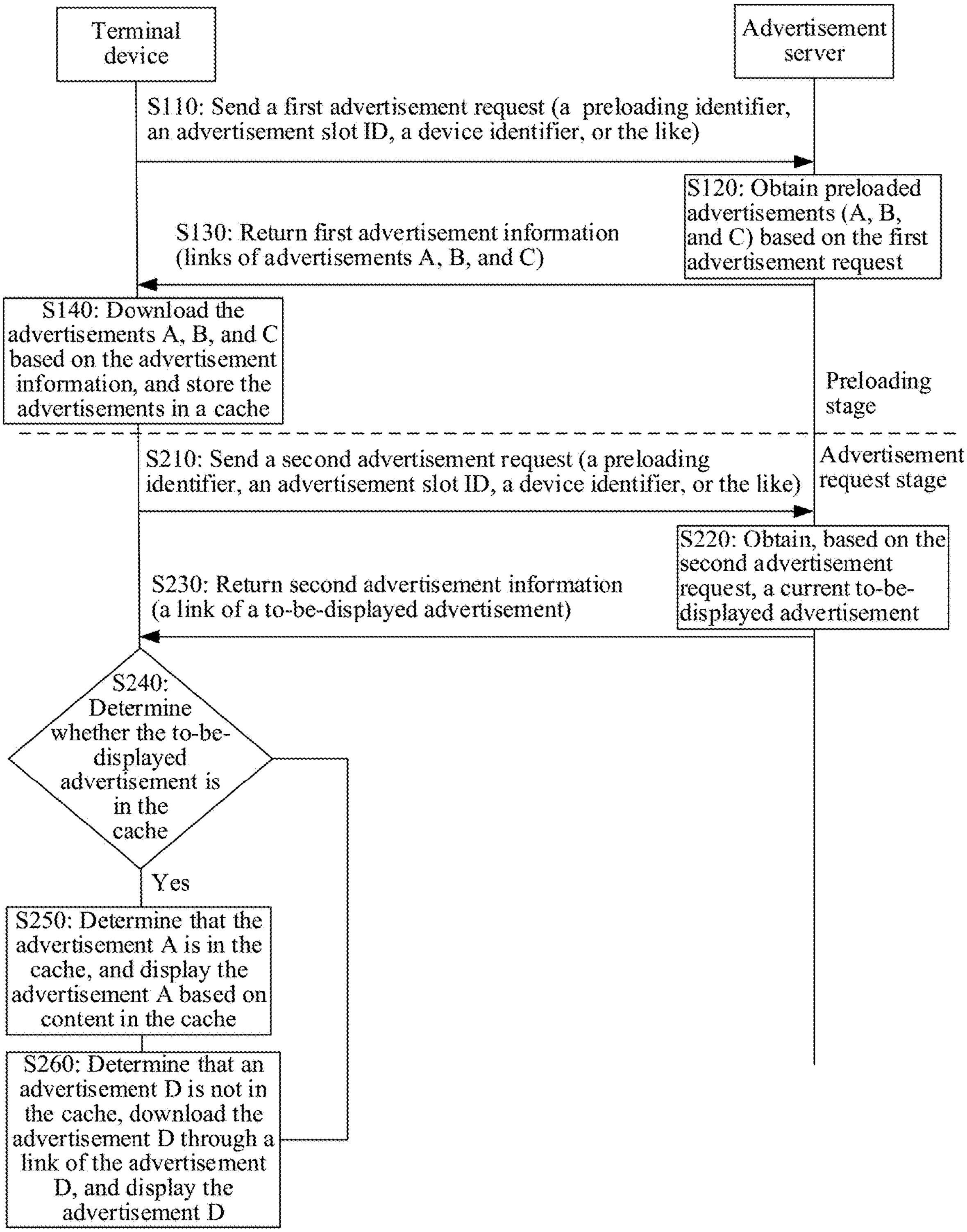
FIG. 5 is a schematic flowchart of an example of an advertisement display method according to this application.
Figure 6:
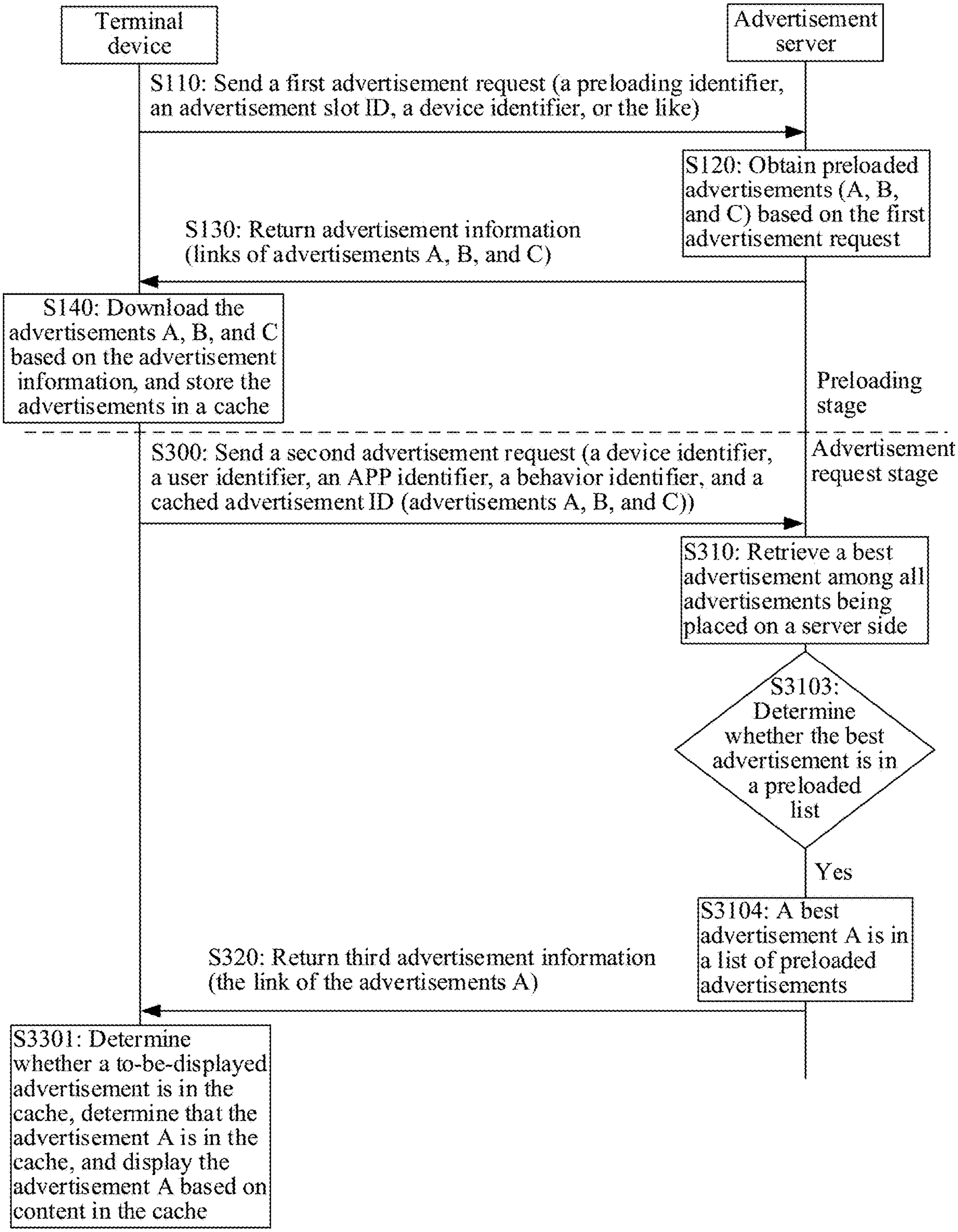
FIG. 6 is a schematic flowchart of another example of an advertisement display method according to this application.
Figure 7:
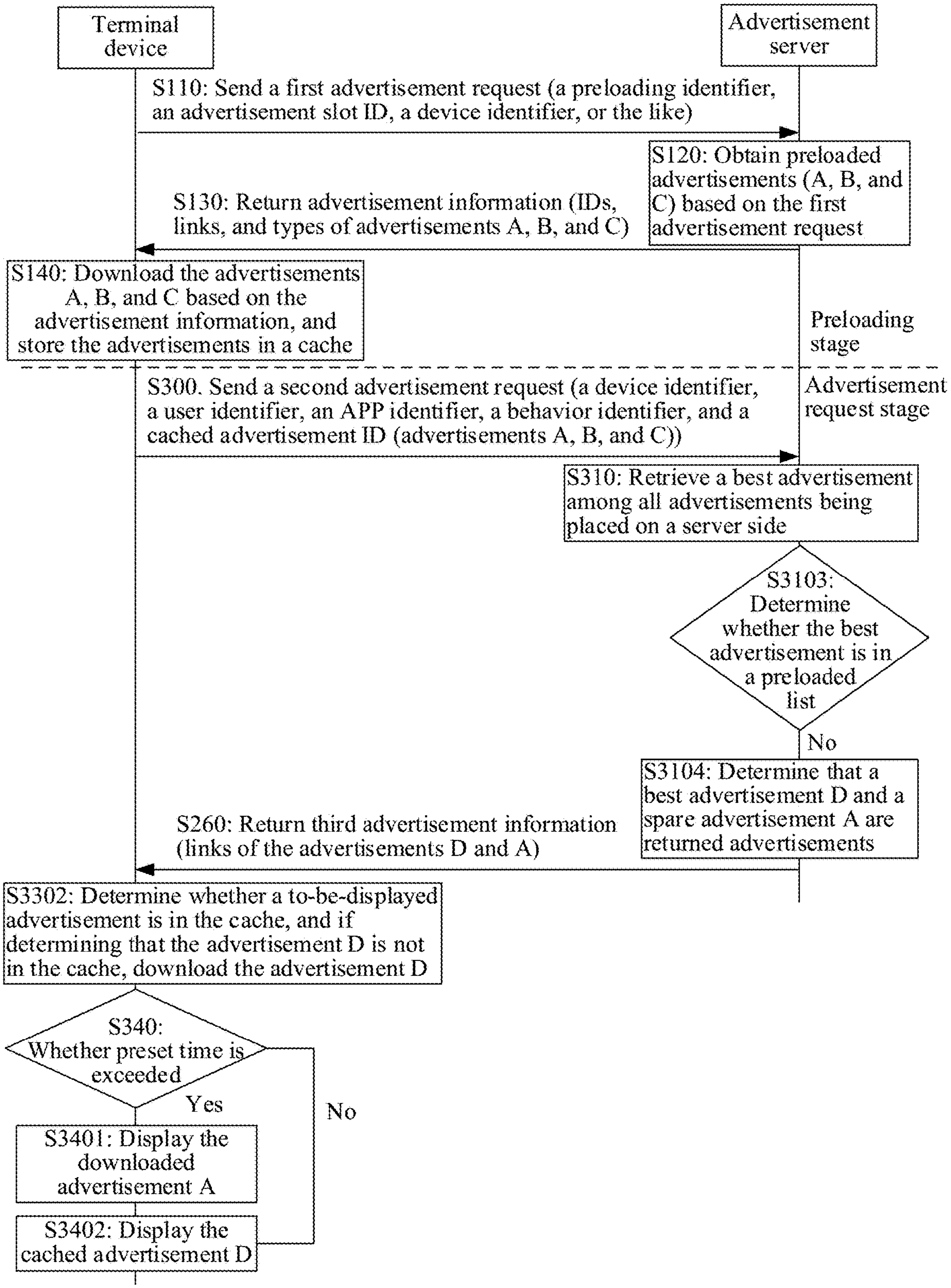
FIG. 7 is a schematic flowchart of another example of an advertisement display method according to this application.

As shown in FIG. 5 to FIG. 7, S110: A terminal device sends a first advertisement request to a server. The first advertisement request is used for requesting preloaded advertisement information.

In some embodiments, the terminal 11 may send the advertisement request to the server 12 based on a network protocol such as the hypertext transfer protocol (HTTP), the hypertext transfer protocol over secure socket layer (HTTPS), the file transfer protocol (FTP), or the secure file transfer protocol (SFTP). In some embodiments, an HTTP request method includes OPTIONS, GET, HEAD, POST, PUT, DELETE, TRACE, CONNECT, and the like.

The advertisement request may carry a parameter such as a name of a current application program, an application package name (pkgname) of the current application program, a version number of the application program, an advertisement slot ID (slotid), and a type of a requested advertisement (adtype), so that a server receiving the advertisement request can determine advertisement information matching the advertisement request.

Further, the advertisement request may include an advertisement slot width and an advertisement slot height. The advertisement slot width and the advertisement slot height are generally less than a width and a height of a screen of the terminal 11.

In addition, the advertisement request may further include device information of the terminal 11, for example, a device type (devicetype) of the terminal 11, an operating system version number (version) of the terminal 11, a device maker of the terminal 11, a device model of the terminal 11, an operating system language used on the terminal 11, an international mobile equipment identity (IMEI), a mobile equipment identifier (MEID), an electronic serial number (ESN), or an Android ID (a unique identifier for an Android device) of the terminal 11, and a media access control (MAC) address of the terminal 11.

In addition, the advertisement request further carries whether the advertisement request is a preloading request "isPreload", so that the server may determine whether it is a case of preloading an advertisement, and return the advertisement corresponding to the case. In this embodiment, the server 12 determines, based on "isPreload": true in the advertisement request, that the advertisement request is used for requesting a preloaded advertisement, but is not an advertisement request used for current display.

An advertisement slot identifier is associated with an advertisement slot in an application program, and the advertisement slot is integrated into the application program. When the application program requests an advertisement, the advertisement slot identifier is carried. When advertisement information returned by the server is received, the application program displays, based on the advertisement slot identifier, the advertisement at a location corresponding to the application program. The advertisement slot is used for displaying an advertisement. The advertisement slot is an area or a window on a page provided by an application program. A type of the advertisement slot may include a splash advertisement, an application wall advertisement, an interstitial advertisement slot, a banner advertisement slot, and the like. The advertisement slot ID is used for uniquely representing a specific position for displaying a current to-be-played advertisement on the current application program. The type of a requested advertisement may include a plurality of types such as a banner advertisement (banner), a splash advertisement (splash), and a native advertisement (native). For example, a type of the banner advertisement is represented by 0, a type of the splash advertisement is represented by 1, and a type of the native advertisement is represented by 2.

For a trigger occasion of the first advertisement request, a trigger mechanism may be defined based on the advertisement SDK. For example, when an application program is started, the application program is triggered to send the first advertisement request, or the first advertisement request is periodically triggered every N minutes. Alternatively, the trigger occasion is determined based on a network status, for example, in a Wi-Fi scenario, and is used for protecting mobile traffic of a user. An objective of preloading an advertisement by the terminal is to reduce a delay from time when an advertisement is requested to time when the terminal displays an advertisement page. A possible displayed advertisement is stored in the terminal device first, so that a cached advertisement material can be used in case of a delay in a subsequent advertisement request process.

For example, the advertisement request sent by the terminal 11 to the server 12 is as follows:

```
{
  "application program": {
    "name": "Huawei Browser",   //application program name
    "pkgname": "com.huawei.browser",   //application program
package name
    "version": "8.0.8.300" //application program version number
  },
  "device": {
    "height": 1920, //device height
    "oaid": "a22c389c-e0a1-8353-f014-d3b62721e7d2",
    "language": "zh", //device language
    "maker": "HUAWEI", //device manufacturer
    "model": "MHA-AL00", //device model
    "os": "android", //operating system
    "type": 4, //device type
    "version": "7.0", //device version
    "width": 1080, //device width
  },
  "multislot": [{
    "adtype": 3, //advertisement type
    "height": 1920, //advertisement slot height
    "slotid": "a09itw7hsf", //advertisement slot identifier
    "test": 0, //whether the advertisement is a test advertisement
    "width": 1080 //advertisement slot width
  }
 ],
  "network": {
    "type": 2 //network type
  },
 "isPreload": true, //whether the request is a preloading request
  "sdkversion": "3.4.11.300" //SDK version number
 }
```

In some embodiments of this application, the advertisement request may further include user behavior data recorded by the terminal 11 and a device parameter of the terminal. In some embodiments, the user behavior data includes an ID of a user, a search record of the user, a call record of the user, address information of the user (for example, a recently visited address), and the like. In another aspect, the server may find a corresponding user profile through the ID of the user, and place an advertisement corresponding to the user based on the user profile. The user profile may include: a song type that the user likes, a work habit of the user, a search record of the user, an access record of the user, a call record of the user, address information (for example, a recently visited address) of the user, a gender of the user, an age range of the user, and the like.

In some embodiments, the device parameter may include: whether an application program is installed, Wi-Fi information, a device brand, a device model, a device type (a watch, a mobile phone, or a tablet), whether a headset is connected, a current location of the terminal (GPS data), an application currently triggered by the terminal, and the like.

S120: The server obtains a preloaded advertisement based on the first advertisement request.

Figure 8:
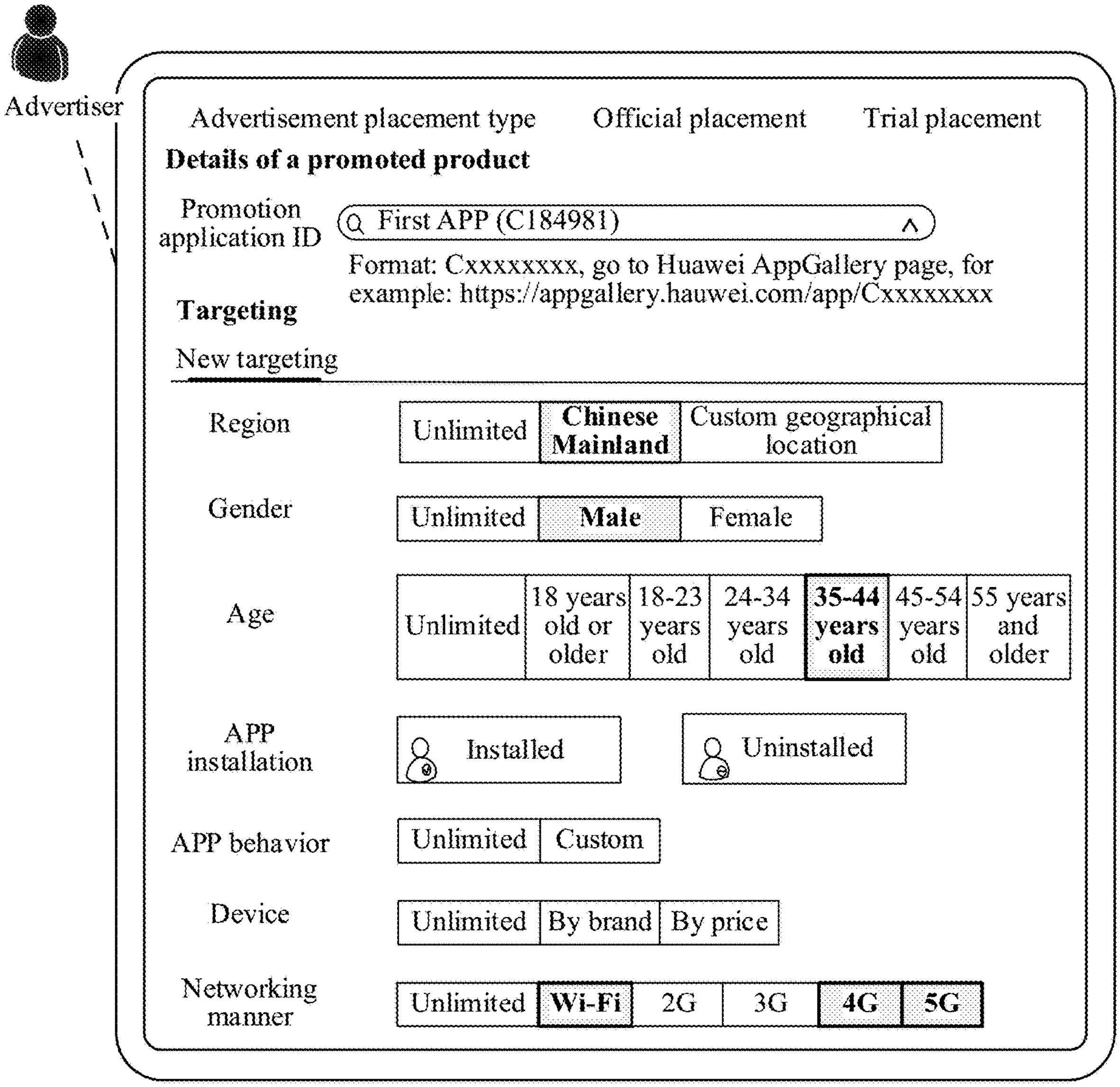
FIG. 8 is a schematic diagram of an example of an interface for creating an advertisement on an advertising platform by an advertiser according to this application.

An advertisement placement requirement may be set by an advertiser when the advertiser places an advertisement. FIG. 8 is a schematic diagram of an example of an interface in which the advertiser creates, on an advertising platform, an advertisement targeted at an application installation status. The advertiser may create an advertisement task on the interface and set a requirement of an advertisement that needs to be placed. As shown in FIG. 8, the advertiser may select or enter, in a "promotion application ID" menu bar, an application program that an advertisement needs to be targeted. For example, the application program is "first application program"; or, in targeting information, a region, a gender, an age, whether an application program is installed, an application program behavior, a device type, a network connection manner, and the like are selected.

Behavior of the user may be casual puzzle, audio and video entertainment, business strategy, utility, travel navigation, role play, shopping price comparison, tourism and accommodation, and the like. In this category, a second-level category may be further included. For example, the casual puzzle category may include casual, elimination, puzzle, puzzle-solving, music rhythm, and the like, and the tourism and accommodation category may include hotels, homestay, and the like.

When selecting a best advertisement or a spare advertisement, the server performs retrieval based on information carried in the advertisement request and an advertisement placement requirement on a server side. Specifically, the advertisement request of the terminal may carry user behavior data, device information of the terminal 11, or the like. In this way, the server 12 may select, from an advertisement resource pool, an advertisement related to the foregoing information as the best advertisement, thereby improving advertisement display efficiency and user experience that is obtained when the user uses the application program.

For example, the user behavior data included in the advertisement request may be a search record of the user, and the server 12 may determine, based on the search record of the user, target information that the user recently pays attention to. For example, the search record of the user search is a car of a brand. In this way, the server 12 may select an advertisement associated with the target information from the advertisement resource pool as the best advertisement. For example, an advertisement with an advertisement requirement "shopping price comparison" in the advertisement resource pool is the best advertisement.

For example, the user behavior data may alternatively be a song play record when the user uses a music application program, and a user preference such as a favorite music type and/or a favorite singer of the user may be determined based on the carried song play record, so that the server 12 selects an advertisement corresponding to the user preference from the advertisement resource pool as the best advertisement. For example, an advertisement with an advertisement requirement "audio and video entertainment" in the advertisement resource pool is the best advertisement.

For example, if a device maker carried in the advertisement request is Huawei, the server 12 may use one or more advertisements related to Huawei in the advertisement resource pool as the best advertisement.

For example, when it is detected that the user holds the terminal 11 during jogging or starts a motion-related application program, it may be determined that the terminal 11 is in a motion scenario. Further, the server 12 selects an advertisement corresponding to the motion scenario from the advertisement resource pool as the best advertisement. For example, an advertisement with an advertisement requirement "utility" in the advertisement resource pool is the best advertisement. For example, when it is detected that the user starts a game application program, it may be determined that the terminal 11 is in a game scenario. In a game scenario, the server 12 further selects an advertisement corresponding to the game scenario from the advertisement resource pool as the best advertisement. For example, an advertisement with an advertisement requirement "casual puzzle" in the advertisement resource pool is the best advertisement.

In some other cases, when performing retrieval based on information carried in the advertisement request and the advertisement delivery requirement on the server side, the server determines a retrieval priority based on a specific case. For example, the advertisement placement requirement on the server side is preferentially considered. For example, if an advertisement placement requirement is a large quantity of display in a time period, the server preferentially considers the advertisement placement requirement. In this case, the server does not accurately match whether behavior data or a device parameter of a user matches advertisement content, but places an advertisement to more terminal devices. In some embodiments, the server preferentially returns an advertisement that has a contract schedule with the advertiser, or selects an advertisement with a high eCPM (effective cost per mile, advertisement revenue that can be obtained every 1000 display times).

The advertisement correlated with the target information may be that: An advertisement placement targeting requirement is the same as or associated with a requirement in the advertisement request. For example, a same case is that the advertisement placement targeting requirement is to place an advertisement to a terminal device of Huawei, and terminal device information carried in a parameter in the advertisement request is Huawei. An associated case may be that the advertisement placement targeting requirement and the requirement in the advertisement request are in an inclusion relationship, a similar classification, or another correlation relationship. Another associated case may be that the advertisement placement targeting requirement is to place an advertisement to a mobile phone device, and the terminal device information carried in the parameter in the advertisement request is a Huawei mobile phone.

In some other embodiments, if the advertiser does not set specific targeting information, in this case, the server may pre-establish an advertisement prediction model through a big data mining tool, collect big data, and place the advertisement of the advertiser to a related user terminal device, to improve an advertisement exposure rate. For example, if it is determined, based on the user behavior data, that the user is a frequent shopping user, but the advertiser does not set a specific targeting requirement, the server determines, based on advertisement content, that the advertisement is a sales advertisement, and determines that such an advertisement is an advertisement associated with the target information.

In this embodiment, preloaded advertisements A, B, and C related to an application are obtained based on an application package name in the first advertisement request. Specifically, a targeting condition set by the advertiser is: pushing an advertisement of the "HUAWEI phone" to a user who has installed a "Huawei Browser" application program.

S130: The advertisement server returns first advertisement information to the terminal device.

For example, the returned first advertisement information may include a return value (retcode) of a response message, "preloadAdinfo"://preloading advertisement information. When the advertisement information matching the advertisement request is not found successfully, the response message may further include an error reason of a response failure.

The advertisement information may include parameters such as an advertisement slot ID (slotid), an advertisement creative type (creativetype), and a material ID (contentid) of an advertisement material corresponding to the advertisement request. The advertisement creative type may include types such as a text advertisement, an image advertisement, an image-text advertisement, and a graphics interchange format (GIF) advertisement.

Further, the first advertisement information may further include parameters such as an advertisement material download link (html), a deeplink address, an advertisement material digest value (sha256), and an advertisement interaction type (interactiontype). The advertisement interaction type may include interaction types such as no response to a user tap, opening a related web page after a user tap, downloading an application after a user tap, and entering an application after a user tap

```
{
"retcode": 200, //return value
"preloadAdinfo": //preload advertisement information
 [{
  "slotid": "a09itw7hsf", //advertisement slot identifier
  "adid": "A", //first advertisement ID
  "interactiontype": 3, //the interaction type is entering an application after a user
tap
  "creativetype": 2, //the creative type is an image advertisement
 "image": "http://cs.op.hicloud.com/contserver/data/98BE13F2CD19D41.jpg",
//download link
  "deeplink": "id application program://XXXXXXXX" //deeplink address
 },
 {
  "slotid": "a09itw7hsf", //advertisement slot identifier
  "adid": "B", //advertisement ID
  "interactiontype": 3, //the interaction type is entering an application after a user
tap
  "creativetype": 2, //the creative type is an image advertisement
 "image": "http://cs.op.hicloud.com/contserver/data/98BE13F2CD19D42.jpg",
```

-continued

```
//download link
      "deeplink": "jd application program://XXXXXXXX" //deeplink address
   },
   {
      "slotid": "a09itw7hsf", //advertisement slot identifier
      "adid": "C", //advertisement ID
      "interactiontype": 3, //the interaction type is entering an application after a user
tap
      "creativetype": 2, //the creative type is an image advertisement
   "image":   "http://cs.op.hicloud.com/contserver/data/98BE13F2CD19D43.jpg",
//download link
      "deeplink": "jd application program://XXXXXXXX" //deeplink address}
   ]
   }
```

In the return message, the terminal may download the advertisement from the server through a link (URL link) corresponding to the advertisement ID. For example, a corresponding image may be downloaded from http://cs.op.hicloud.com/contserver/data/98BE13F2CD19D42.jpg.

In addition, in this embodiment, "interactiontype": 3 represents that the interaction type is entering an application after a user tap. Specifically, after a user taps an advertisement, the user may use a "deeplink" address: "jd application program://XXXXXXXX" to enter a corresponding application.

S140: The terminal downloads a corresponding advertisement based on the advertisement information, and stores the advertisement in a cache.

The terminal device stores relevant information in the advertisement information in a lightweight database (SQLite). Because the lightweight database (SQLite) occupies very low resources, SQLite specially configured to store advertisement information may be disposed in the terminal 11. SQLite may be a db file, and a specific storage location may be stored in a mobile phone system or an APP file path. The advertisement information includes an advertisement ID, an advertisement material download link, an advertisement slot identifier, an advertisement type, and the like.

For example, when the terminal 11 is in a Wi-Fi network, the terminal 11 may be triggered to download, in a background based on a download link or a deeplink address in the advertisement information, an advertisement material corresponding to the advertisement information from the advertisement resource pool of the server 12, and the advertisement material is locally stored. After downloading the advertisement material locally, the terminal may update a storage address of the advertisement material in an SQLite file. The following table is an example for description. The advertisement A has been downloaded, and a storage address is diskcache://b5d132930c6141ff102b6f3b15565. The advertisements B and C have not been downloaded.

| slotid | adid | interactiontype | creativetype | splashPreContent Flag | image | slashMediaPath |
|---|---|---|---|---|---|---|
| a09itw7hsf | A | 3 | 2 | 0 | http://cs.op.hi . . . 41.jpg | diskcache://b5d132930c6141ff102b6f3b15565 |
| a09itw7hsf | B | 3 | 2 | 0 | http://cs.op.hi . . . 42.jpg | |
| a09itw7hsf | C | 3 | 2 | 0 | http://cs.op.hi . . . 43.jpg | |

In this way, additional traffic overheads caused to the user when the terminal 11 downloads the advertisement material in a mobile network can be reduced. In addition, because a size of the advertisement material is usually large, the advertisement material may be locally stored in a form of a file, to improve a reading speed at which the terminal 11 reads the advertisement material.

Embodiment 1

Stage 2: The Terminal Requests a Current to-be-Played Advertisement.

In some cases, based on a parameter in an advertisement request and a real-time advertisement placement requirement of the advertiser, the server returns different to-be-displayed advertisement information for advertisement requests sent by a same client in different time periods, because a behavior data parameter of the user or a device parameter changes, or the placement requirement of the advertiser changes, or due to an advertisement period. In addition, a quantity of preloaded advertisement materials is limited due to a size of a local storage of the mobile phone. However, a quantity of advertisement materials that need to be placed by the advertisement server is far greater than this order of magnitude. In other words, in most cases, a returned advertisement is not in a preloaded list. An actual hit rate of the preloaded advertisement of the terminal generally ranges from 30% to 50%. In this case, in most cases in which the advertisement material is not preloaded, the advertisement material still needs to be downloaded through a real-time advertisement request.

S210: The electronic device 100 detects a first operation performed on a first page of the first application program, and in response to the first operation, the terminal sends a second advertisement request to the server, where the second advertisement request is used for obtaining current to-be-displayed advertisement content from the server.

In some embodiments, the first page may be any page provided by the first application program, for example, a home page or another subpage. The first operation may be a touch operation (for example, an operation of tapping an icon of the first application program, or an operation of switching a page of the first application program (for example, an operation of tapping a next page and an operation of sliding a page)), a voice instruction, a shake operation, or the like.

Figure 9A:
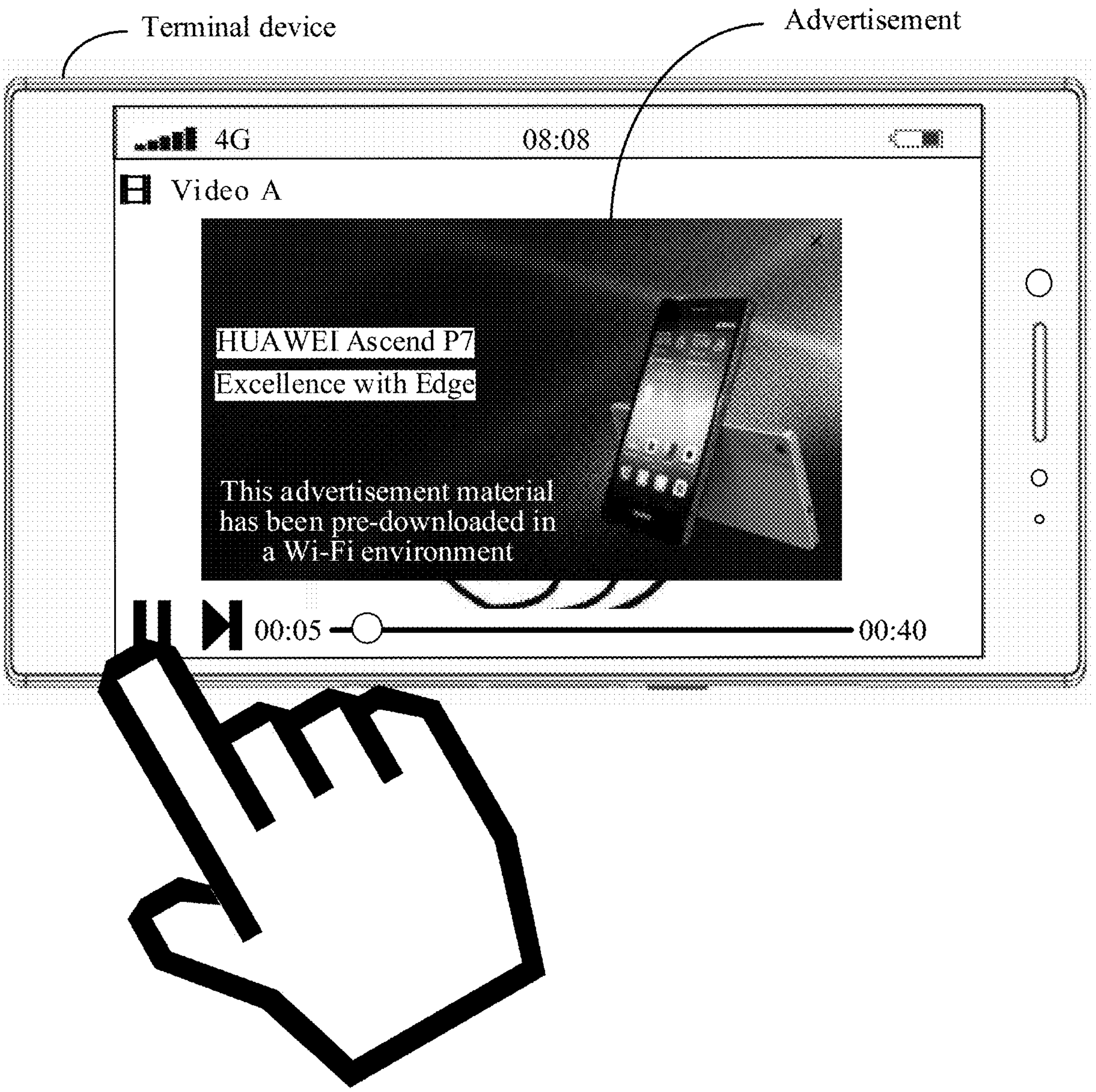
FIG. 9A to FIG. 9C each are a schematic diagram of an example of an interface for displaying an advertisement by a terminal device according to this application.

In some embodiments, in a process in which the terminal 11 runs an application program, the terminal 11 may be triggered to request a corresponding advertisement material from the server 12. For example, as shown in FIG. 9A, in a process in which a user watches a video by using a video application, when detecting that the user triggers a pause button, the terminal 11 may send an advertisement request to the server 12, so that the server 12 returns advertisement information corresponding to the advertisement request to the terminal 11. In this way, the terminal 11 may obtain a corresponding advertisement material from the advertisement resource pool of the server 12 based on the advertisement information, and display the obtained advertisement material on a current video pause screen.

Figure 9B:

In some embodiments, as shown in FIG. 9B, when it is detected that the user taps an icon of a browser application on a desktop, the terminal 11 may invoke an application programming interface (API) of the browser application to start the browser application, and the terminal 11 may further send, to the server 12, an advertisement request for requesting a current to-be-played advertisement.

Figure 9C:
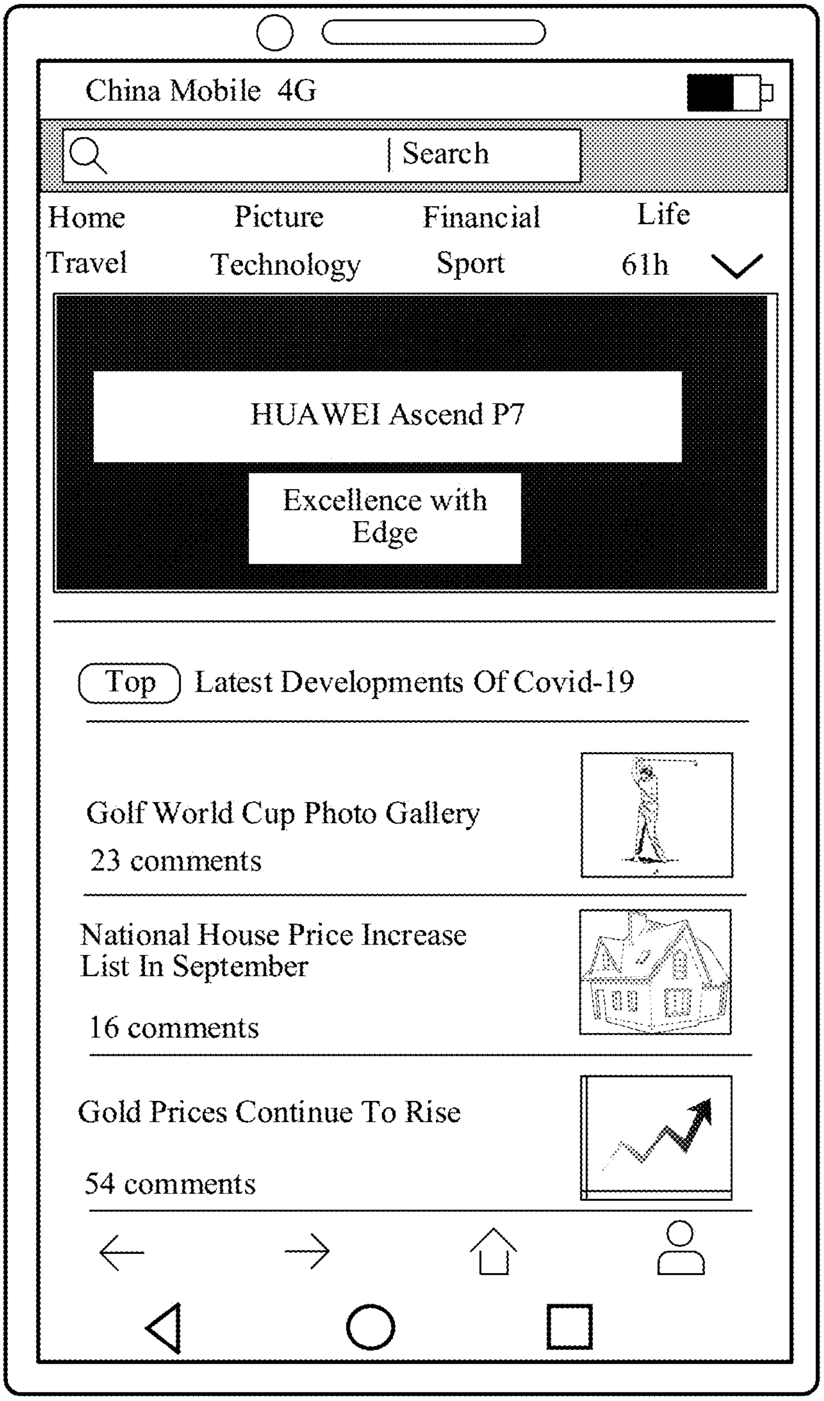

In some embodiments, as shown in FIG. 9C, after a browser application is started, when home page content is displayed, a terminal sends a request to a server, to request advertisement content to be displayed on a home page.

A specific parameter carried in the second advertisement request is similar to that carried in the first advertisement request. For details, refer to the foregoing descriptions. Details are not described herein again.

In this embodiment, the server 12 determines, based on "isPreload": true in the advertisement request, that the advertisement request is used for requesting a current to-be-displayed advertisement, instead of requesting a preloaded advertisement.

In addition, the advertisement request carries a preloaded advertisement slot identifier. For example, in this embodiment, the advertisement request carries a cached advertisement A, advertisement B, advertisement C, and "cacheContentIds"=["A", "B", "C"].

For example, the second advertisement request sent by the terminal 11 to the server 12 is as follows:

```
{
  "application program": {
    "name": "Huawei Browser",   //application program name
    "pkgname": "com.huawei.browser",   //application program
package name
```

-continued

```
    "version": "8.0.8.300"   //application program version number
  },
  "device": {
    "height": 1920, //device height
    "oaid": "a22c389c-e0a1-8353-f014-d3b62721e7d2",
    "language": "zh", //device language
    "maker": "HUAWEI", //device manufacturer
    "model": "MHA-AL00", //device model
    "os": "android", //operating system
    "type": 4, //device type
    "version": "7.0", //device version
    "width": 1080, //device width
  },
  "multislot": [{
    "adtype": 3, //advertisement type
    "height": 1920, //advertisement slot height
    "slotid": "a09itw7hsf", //advertisement slot identifier
    "test": 0, //whether the advertisement is a test advertisement
    "width": 1080 //advertisement slot width
  }
 ],
  "network": {
    "type": 2 //network type
  },
 "isPreload": false, //whether the request is a preloading request
 "cacheContentIds"=["A", "B", "C"], //preloaded advertisement IDs
   "sdkversion": "3.4.11.300" //SDK version number
 }
```

S220: The server 12 obtains, based on the second advertisement request, a current to-be-displayed advertisement A.

After receiving the advertisement request, the server 12 first determines whether the advertisement request is used for preloading an advertisement or is used for requesting a current to-be-displayed advertisement. In this embodiment, the server 12 determines, based on "isPreload": false in the advertisement request, that the advertisement request is used for requesting a current to-be-displayed advertisement, and is not a request used for preloading an advertisement.

Based on information carried in the advertisement request and the advertisement placement requirement on the server side, the advertisement A that best matches the advertisement placement requirement is selected from all advertisements being placed on the server side.

S230: The server 12 returns second advertisement information of the second advertisement request.

Similar to the advertisement request, the response message sent by the server 12 may also be represented in the JSON message format.

For example, the response message sent by the server 12 to the terminal 11 is as follows:

```
{
 "retcode": 200, //return value
 "adinfo": //advertisement information
  [{
   "slotid": "a09itw7hsf", //advertisement slot identifier
   "adid": "D", //advertisement ID
   "spare": false, //whether the advertisement is a spare advertisement
   "interactiontype": 3, //the interaction type is entering an application after a user
tap
   "creativetype": 2, //the creative type is an image advertisement
 "image": "http://cs.op.hicloud.com/contserver/data/98BE13F2CD19D47.jpg",
//download link
   "deeplink": "jd application program://XXXXXXXX" //deeplink address
  },
  {
   "slotid": "a09itw7hsf", //advertisement slot identifier
   "adid": "A", //advertisement ID (the parameter is "adid": "D" in the embodiment
of S260)
   "interactiontype": 3, //the interaction type is entering an application after a user
tap
```

-continued

"creativetype": 2, //the creative type is an image advertisement
"image": "http://cs.op.hicloud.com/contserver/data/98BE13F2CD19D43.jpg", //download link
"deeplink": "jd application program://XXXXXXXX" //deeplink address}
]
}

S240: Determine, based on the second advertisement information, whether the to-be-displayed advertisement is in the cache.

S250: If the to-be-displayed advertisement is in the cache, directly invoke the advertisement from the cache and display the advertisement.

Figure 10:
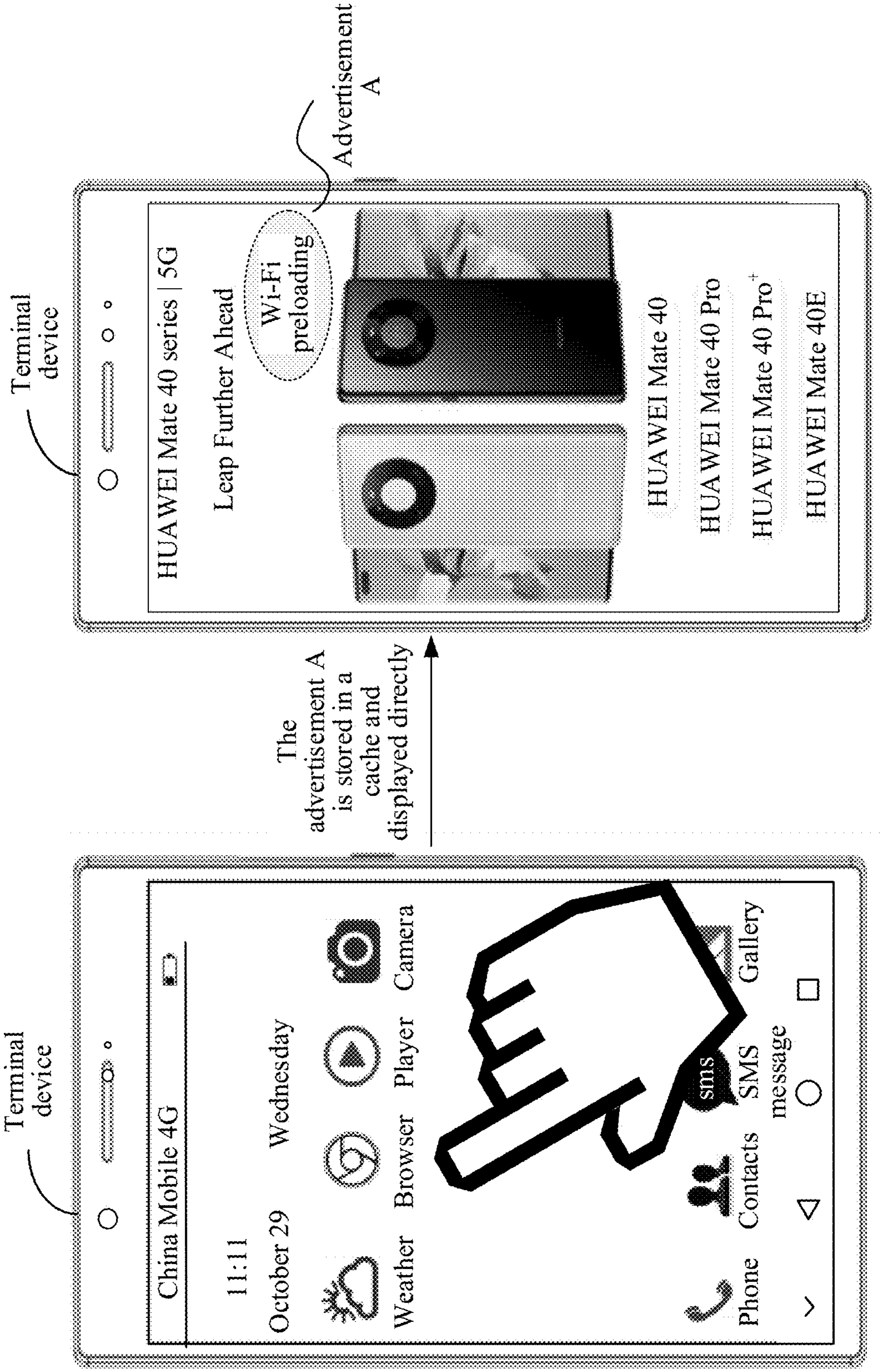
FIG. 10 is a schematic diagram of another example of an interface for displaying an advertisement by a terminal device according to this application.

In some embodiments, the terminal determines, based on the advertisement ID "adid": "A" and the preloaded list "cacheContentIds"=["A", "B", "C" ], that the to-be-displayed advertisement A in returned second advertisement information is in the preloaded list, and the terminal 11 obtains the to-be-displayed advertisement A from the cache and displays the to-be-displayed advertisement A, as shown in FIG. 10.

S260: If the to-be-displayed advertisement is not in the cache, download the advertisement from the server, and display the advertisement.

Figure 11A:
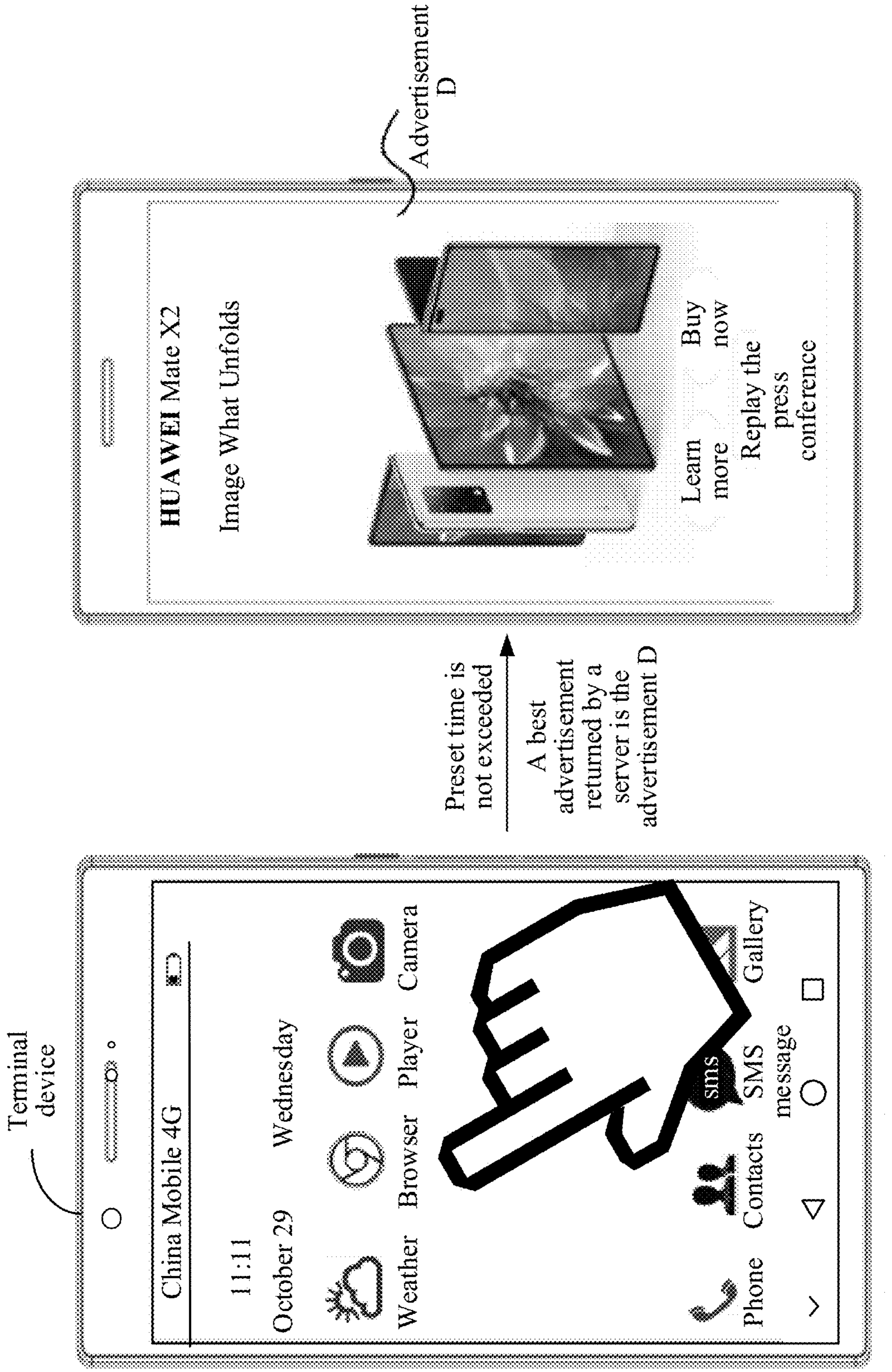
FIG. 11A and FIG. 11B are a schematic diagram of another example of an interface for displaying an advertisement by a terminal device according to this application.
Figure 11B:
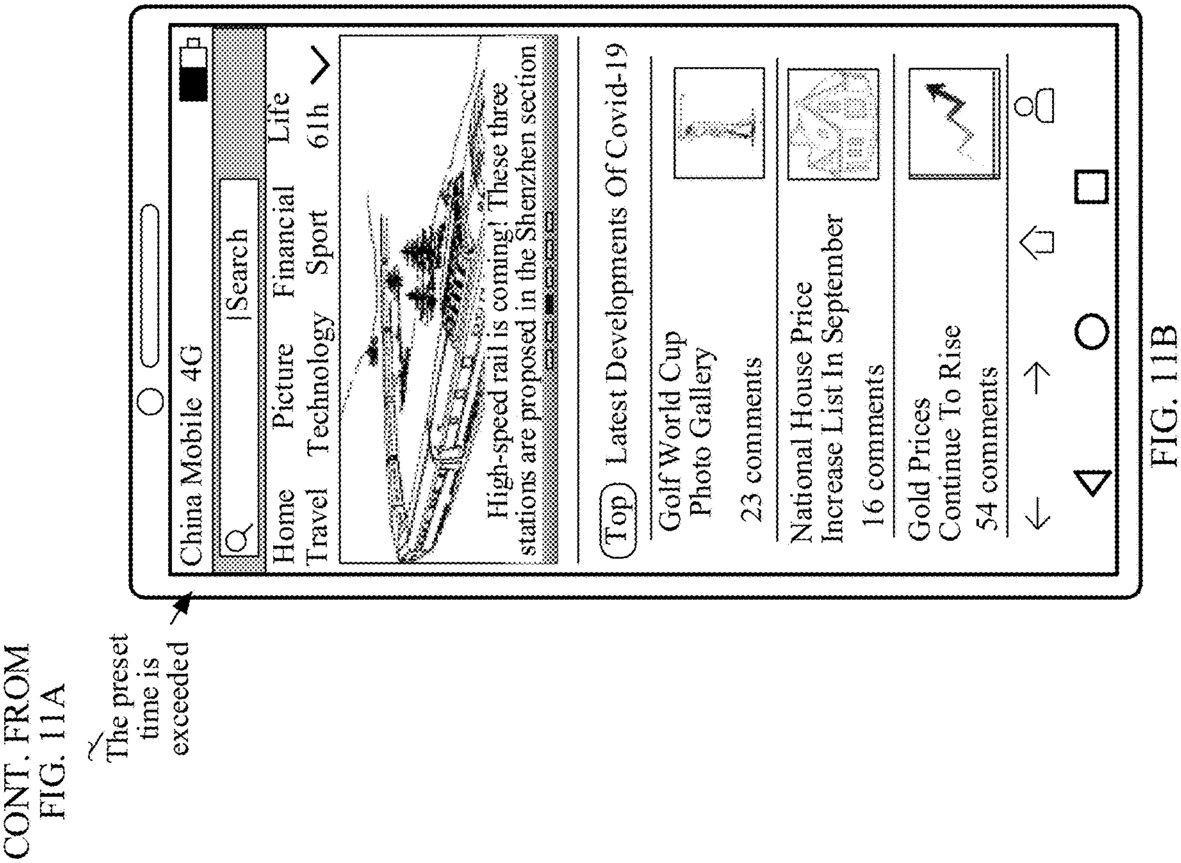

In some embodiments, the terminal determines, based on the advertisement ID "adid": "D" and the preloaded list "cacheContentIds"=["A", "B", "C" ], that the to-be-displayed advertisement D in the returned second advertisement information is not in the preloaded list, and the terminal 11 obtains the to-be-displayed advertisement A from the server and displays the to-be-displayed advertisement A, as shown in FIG. 11A and FIG. 11B.

In this case, to prevent an excessively long delay from affecting actual user experience, an advertisement display time may be set in some application programs. Specifically, a delay of an entire process from requesting an advertisement to finally displaying the advertisement is controlled to be within a time period, for example, within 2 s. When advertisement download time exceeds the preset time, the application program no longer displays the advertisement, and directly accesses a media application. In this case, if a splash advertisement is not displayed, a delay of downloading the advertisement material is excessively long, this may cause a problem that the advertisement cannot be effectively displayed.

Embodiment 2

Stage 2: The Terminal Requests a Current to-be-Played Advertisement.

As shown in FIG. 6, S300: The electronic device 100 detects a first operation performed on a first page of the first application program, and in response to the first operation, the terminal sends a third advertisement request to the server, where the third advertisement request is used for obtaining current to-be-displayed advertisement content from the server.

In some embodiments, the first page may be any page provided by the first application program, for example, a home page or another subpage. The first operation may be a touch operation (for example, an operation of tapping an icon of the first application program, or an operation of switching a page of the first application program (for example, an operation of tapping a next page and an operation of sliding a page)), a voice instruction, a shake operation, or the like.

In some embodiments, in a process in which the terminal 11 runs an application program, the terminal 11 may be triggered to request a corresponding advertisement material from the server 12. For example, as shown in FIG. 9A, in a process in which a user watches a video by using a video application, when detecting that the user triggers a pause button, the terminal 11 may send an advertisement request to the server 12, so that the server 12 returns advertisement information corresponding to the advertisement request to the terminal 11. In this way, the terminal 11 may obtain a corresponding advertisement material from the advertisement resource pool of the server 12 based on the advertisement information, and display the obtained advertisement material on a current video pause screen.

In some embodiments, as shown in FIG. 9B, when it is detected that the user taps an icon of a browser application on a desktop, the terminal 11 may invoke an application programming interface (API) of the browser application to start the player application, and the terminal 11 may further send, to the server 12, an advertisement request for requesting a current to-be-played advertisement.

In some embodiments, as shown in FIG. 9C, after a browser application is started, when home page content is displayed, a terminal sends a request to a server, to request advertisement content to be displayed on a home page.

A specific parameter carried in the third advertisement request is similar to that carried in the first advertisement request. For details, refer to the foregoing descriptions. Details are not described herein again.

In this embodiment, the server 12 determines, based on "isPreload": true in the advertisement request, that the advertisement request is used for requesting a current to-be-displayed advertisement, instead of requesting a preloaded advertisement.

In addition, the advertisement request carries a preloaded advertisement slot identifier. For example, in this embodiment, the advertisement request carries a cached advertisement A, advertisement B, advertisement C, and "cacheContentIds"=["A", "B", "C"].

For example, the advertisement request sent by the terminal 11 to the server 12 is as follows:

{
"application program": {
"name": "Huawei Browser", // application program name
"pkgname": "com.huawei.browser", //application program package name
"version": "8.0.8.300" //application program version number
},
"device": {
"height": 1920, //device height
"oaid": "a22c389c-e0a1-8353-f014-d3b62721e7d2",
"language": "zh", //device language
"maker": "HUAWEI", //device manufacturer
"model": "MHA-AL00", //device model -continued

```
    "os": "android", //operating system
    "type": 4, //device type
    "version": "7.0", //device version
    "width": 1080, //device width
  },
  "multislot": [{
    "adtype": 3, //advertisement type
    "height": 1920, //advertisement slot height
    "slotid": "a09itw7hsf", //advertisement slot identifier
    "test": 0, //whether the advertisement is a test advertisement
    "width": 1080 //advertisement slot width
  }
],
  "network": {
    "type": 2 //network type
  },
"isPreload": false, //whether the request is a preloading request
"cacheContentIds"=["A", "B", "C"], //preloaded advertisement IDs
  "sdkversion": "3.4.11.300" //SDK version number
}
```

S310: The server 12 obtains, based on the third advertisement request, a current to-be-displayed advertisement.

S3101: After receiving the third advertisement request, the server 12 first determines whether the advertisement request is used for preloading an advertisement or is used for requesting a to-be-displayed advertisement.

In this embodiment, the server 12 determines, based on "isPreload": false in the advertisement request, that the advertisement request is used for requesting a current to-be-displayed advertisement, and is not a request used for preloading an advertisement.

S3102: If the advertisement request is used for requesting the current to-be-displayed advertisement, the server retrieves, based on information carried in the advertisement request and the advertisement placement requirement on the server side, a best advertisement among all advertisements being placed on the server side.

S3103: Determine that the best advertisement is in a list of advertisements preloaded by the terminal.

S3104: If the best advertisement is already in the list of advertisements preloaded by the terminal, directly return the best advertisement.

In this embodiment, the server retrieves, based on the information carried in the advertisement request and the advertisement placement requirement on the server side, a best advertisement A among all advertisements being placed on the server side, determines that the best advertisement A is in a list of "cacheContentIds"=["A", "B", "C"] advertisements, and returns a most matching advertisement A to the terminal device.

S3105: If the best advertisement is not in the list of advertisements preloaded by the terminal, the server retrieves a spare advertisement from the list (specifically, which is the "cacheContentIds" parameter) of advertisements preloaded in the advertisement request. The spare advertisement satisfies two conditions: The spare advertisement is a preloaded advertisement ID, and the spare advertisement is an advertisement that is in the preloaded advertisement IDs and that best matches the advertisement placement requirement.

In this embodiment, the server retrieves, based on the information carried in the advertisement request and the advertisement placement requirement on the server side, a best advertisement D among all advertisements being placed on the server side; determines that the best advertisement D is not in the preloaded advertisement IDs, then retrieves the spare advertisement A that matches the advertisement placement requirement in the preloaded advertisement IDs from the list of the "cacheContentIds"=["A", "B", "C"] advertisements, and returns a most matching advertisement D and the spare advertisement A to the terminal device.

In an embodiment, as shown in FIG. 7, S320: The server 12 returns third advertisement information of the third advertisement request, where the third advertisement information includes a link of the advertisement A.

A message format of the advertisement request is similar, and the response message sent by the server 12 may also be expressed in a JSON message format.

In this embodiment, after the determining step S3104, for example, the response message sent by the server 12 to the terminal 11 is as follows:

```
{
"retcode": 200, //return value
 "adinfo": //advertisement information
  [{
    "slotid": "a09itw7hsf", //advertisement slot identifier
    "adid": "D", //advertisement ID
    "spare": false, //whether the advertisement is a spare advertisement
    "interactiontype": 3, //the interaction type is entering an application after a user
tap
    "creativetype": 2, //the creative type is an image advertisement
  "image":   "http://cs.op.hicloud.com/contserver/data/98BE13F2CD19D47.jpg",
//download link
    "deeplink": "jd application program://XXXXXXXX" //deeplink address
  },
  {
    "slotid": "a09itw7hsf", //advertisement slot identifier
    "adid": "A", //advertisement ID
    "interactiontype": 3, //the interaction type is entering an application after a user
tap
    "creativetype": 2, //the creative type is an image advertisement
  "image":   "http://cs.op.hicloud.com/contserver/data/98BE13F2CD19D43.jpg",
//download link
    "deeplink": "jd application program://XXXXXXXX" //deeplink address}
  ]
 }
```

S330: Determine, based on the second advertisement information, whether the to-be-displayed advertisement is in the cache.

S3301: If the to-be-displayed advertisement is in the cache, directly invoke the advertisement from the cache and display the advertisement.

In some embodiments, the terminal determines, based on the advertisement ID "adid": "A" and the preloaded list "cacheContentIds"=["A", "B", "C" ], that the to-be-displayed advertisement A in returned second advertisement information is in the preloaded list, and the terminal 11 obtains the to-be-displayed advertisement A from the cache and displays the to-be-displayed advertisement A, as shown in FIG. 10.

In another embodiment, as shown in the figure, S320: The server 12 returns third advertisement information of the third advertisement request, where the third advertisement information includes links of the advertisement D and the advertisement A.

S330: Determine, based on the second advertisement information, whether the to-be-displayed advertisement is in the cache.

S3302: If it is determined, based on the second advertisement information, that an advertisement in the second advertisement information is not in the cache, the terminal 11 obtains, from the server 12, a to-be-downloaded advertisement D.

S340. The terminal 11 determines whether time for downloading the advertisement D exceeds preset time.

In an embodiment, the terminal starts timing from the first operation, and determines whether the preset time is exceeded from a second operation. In another embodiment, timing starts when the terminal sends a first request, and it is determined whether the preset time is exceeded since the terminal sends the second request.

| slotid | adid | interactiontype | creativetype | splashPreContent Flag | image | slashMediaPath |
|---|---|---|---|---|---|---|
| ao9itw7hsf | A | 3 | 2 | 0 | http://cs.op.hi . . . 41.jpg | diskcache://b5d132930c6141ff102b6f3b15565 |
| ao9itw7hsf | B | 3 | 2 | 0 | http://cs.op.hi . . . 41.jpg | |
| ao9itw7hsf | C | 3 | 2 | 0 | http://cs.op.hi . . . 41.jpg | |
| ao9itw7hsf | D | 3 | 2 | 1 | http://cs.op.hi . . . 41.jpg | |

A message format of the advertisement request is similar, and the response message sent by the server 12 may also be expressed in a JSON message format.

In addition, the advertisement information carries additional information of the advertisement, where the additional information is used for representing that a returned advertisement is a best advertisement or a spare advertisement. For example, if a parameter identifier of "spare" is false, it indicates that the advertisement is a best advertisement instead of a spare advertisement. If the parameter identifier is true, it indicates that the advertisement is a spare advertisement.

In this embodiment, after the determining step S3105, the response message sent by the server 12 to the terminal 11 is as follows:

```
{
"retcode": 200, //return value
 "adinfo": //advertisement information
  [{
   "slotid": "a09itw7hsf", //advertisement slot identifier
   "adid": "D", //advertisement ID
   "spare": false, //whether the advertisement is a spare advertisement
   "interactiontype": 3, //the interaction type is entering an application after a user
tap
   "creativetype": 2, //the creative type is an image advertisement
 "image":   "http://cs.op.hicloud.com/contserver/data/98BE13F2CD19D47.jpg",
//download link
   "deeplink": "jd application program://XXXXXXXX" //deeplink address
 },
 {
   "slotid": "a09itw7hsf", //advertisement slot identifier
   "adid": "A", //advertisement ID
   "spare": true, //whether the advertisement is a spare advertisement
   "interactiontype": 3, //the interaction type is entering an application after a user
tap
   "creativetype": 2, //the creative type is an image advertisement
 "image":   "http://cs.op.hicloud.com/contserver/data/98BE13F2CD19D43.jpg",
//download link
   "deeplink": "jd application program://XXXXXXXX" //deeplink address}
 ]
 }
```

In an embodiment, the terminal obtains, by querying SQLite, whether the advertisement material is downloaded. Specifically, whether the advertisement is downloaded may be determined by querying whether a storage location in slashMediaPath is updated. In the embodiment shown in the foregoing table, because a storage address whose adid is D is not updated, it is determined that the advertisement D is not downloaded at this moment.

In some other embodiments, the terminal may query, in a folder corresponding to a cache path, whether there is an advertisement material. Specifically, the terminal may query, by querying a name of an advertisement material corresponding to an advertisement adid or an advertisement material identifier, whether there is a corresponding advertisement material. The advertisement material identifier may be obtained by converting the name of the advertisement material or another identifier.

Figure 12A:
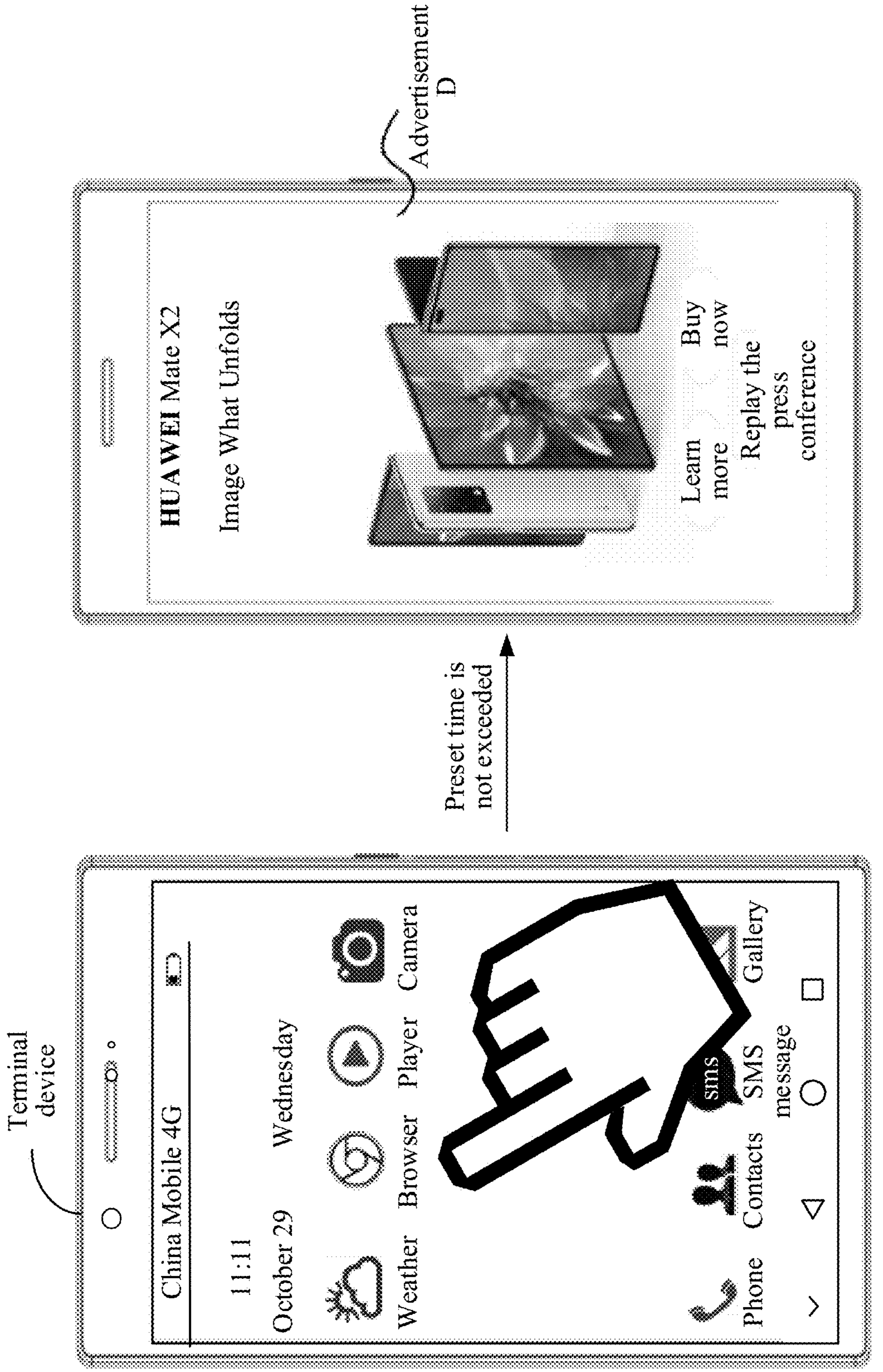
FIG. 12A and FIG. 12B are a schematic diagram of another example of an interface for displaying an advertisement on a terminal device.
Figure 12B:
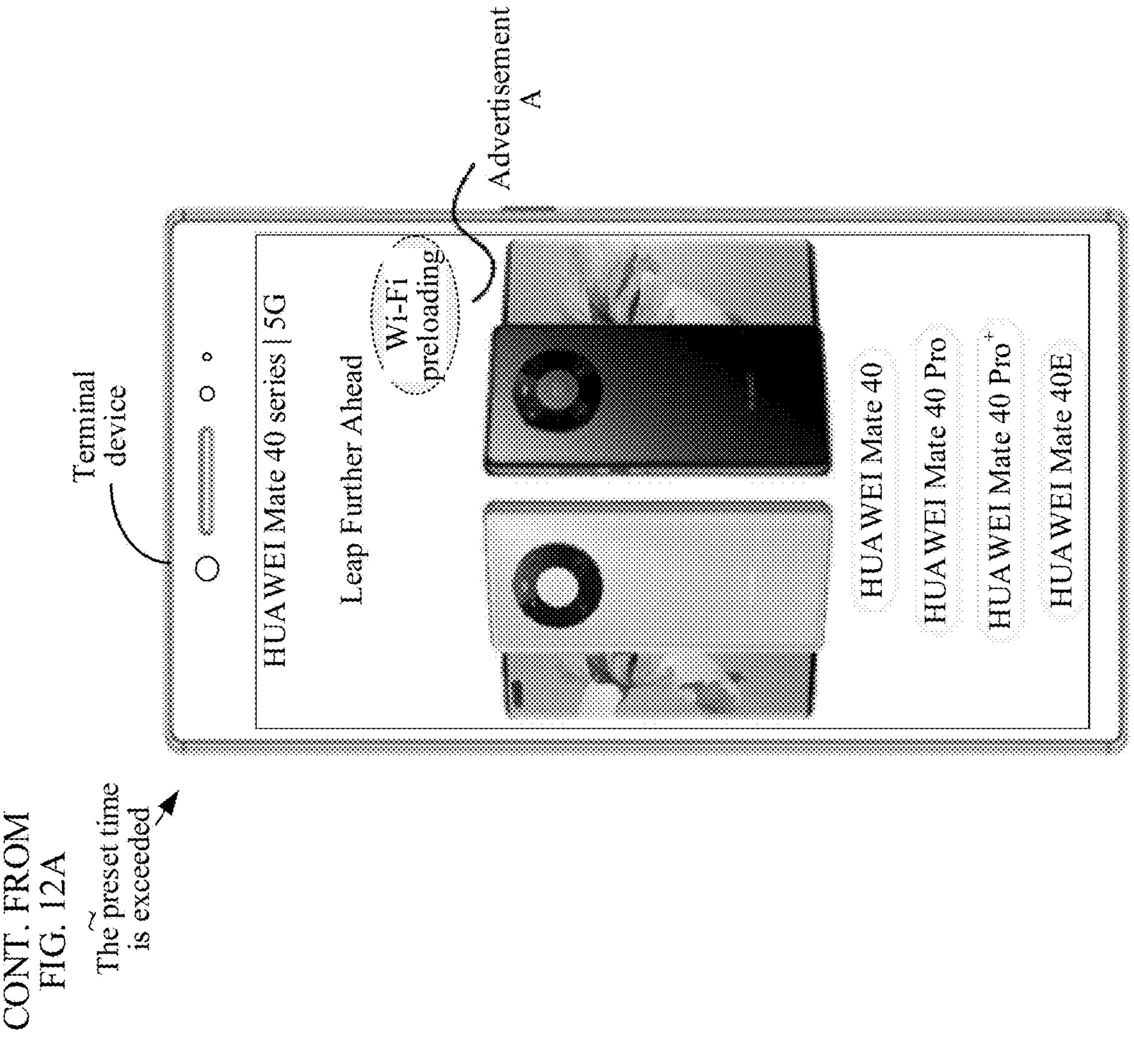

S3401. As shown in FIG. 12A and FIG. 12B, if the terminal determines that advertisement download time exceeds the preset time, the terminal directly obtains the cached advertisement A from the cache, and the terminal 11 displays the advertisement A on a display interface of the terminal 11.

In this embodiment, in a process of playing a current to-be-played advertisement, the terminal 11 does not need to download a second advertisement material from the advertisement resource pool, the terminal 11 may output the stored second advertisement material to the display screen of the terminal 11 for display, and the terminal 11 displays the second advertisement material on the display screen of the terminal 11, to complete the process of playing the current to-be-played advertisement.

In this way, the terminal 11 does not need to download the second advertisement material from the advertisement resource pool, thereby ensuring that a spare advertisement is used for display when advertisement downloading times out, so that the user does not need to spend a large amount of time waiting for an advertisement material downloading process in a process of using an application program, thereby improving a success recommendation probability of the advertisement and user experience for using the application program.

For example, as shown in FIG. 12A and FIG. 12B, when displaying the second advertisement material, the terminal 11 may prompt to the user in forms such as a text that the second advertisement material currently displayed is downloaded in advance in a Wi-Fi environment. Therefore, when the second advertisement material is displayed, the user does not need to worry about extra traffic overheads, thereby improving user experience for using the application program by the user.

S3402. As shown in FIG. 12A and FIG. 12B, if the terminal determines that the advertisement D has been downloaded within the preset time, the terminal displays the advertisement D on the display interface of the terminal, to complete the process of playing the current to-be-played advertisement.

As described above, according to solutions of some embodiments, the best advertisement A is determined whether to complete download within the preset time, and if the download is completed, it indicates that time from terminal requesting (or user triggering) to displaying the advertisement material by the terminal is short, and the best advertisement A is displayed. If the best advertisement A is not downloaded within the preset time, a spare advertisement D is displayed from a local cache, to reduce an advertisement display delay.

Figure 13:
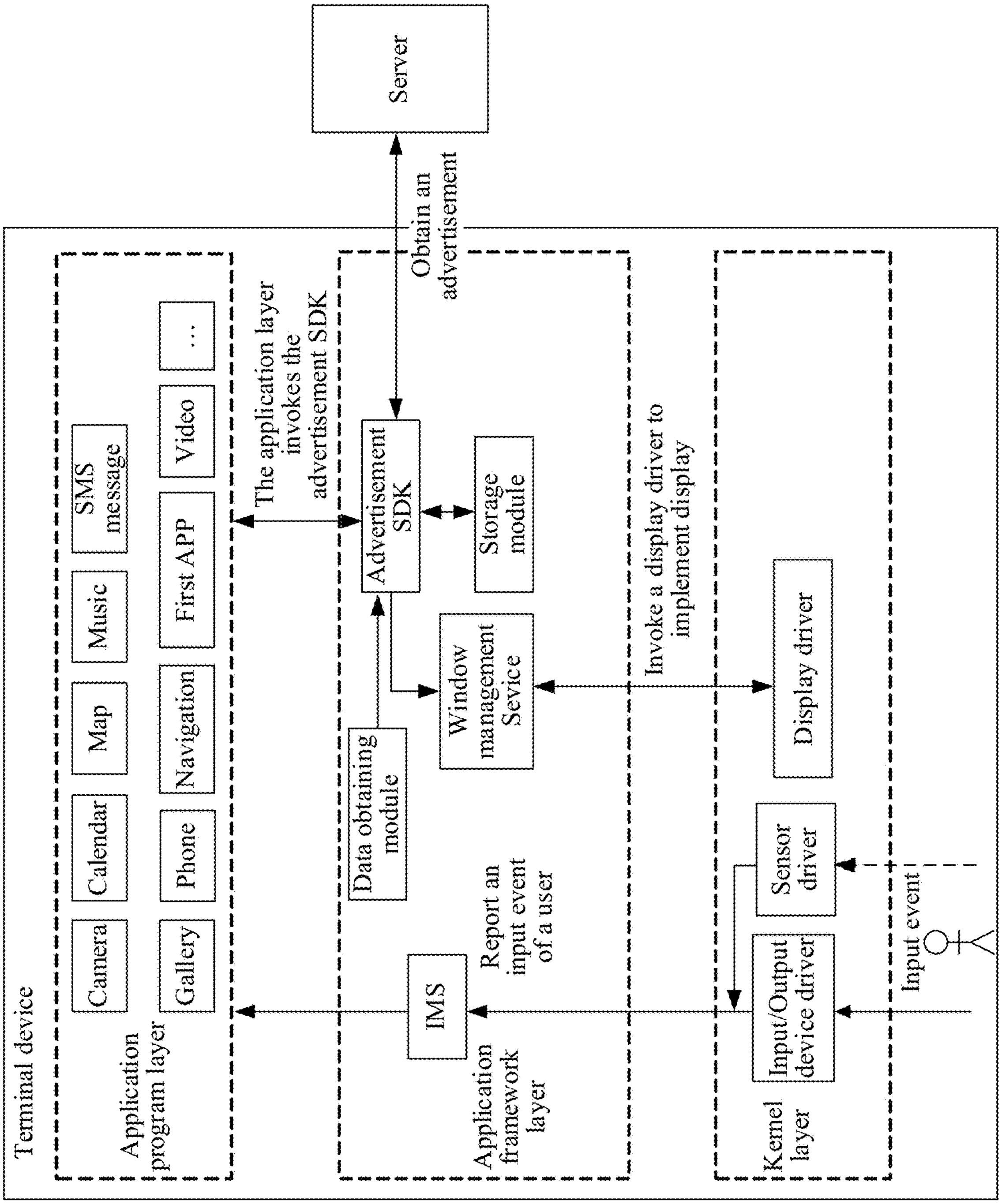
FIG. 13 is a schematic diagram of an example in which a terminal device requests an advertisement from an advertisement server in an operating system of the terminal device.

FIG. 13 is a schematic diagram of information interaction performed when a terminal device requests an advertisement from a server according to an embodiment of this application by using a layered architecture operating system of an Android system or a HarmonyOS system as an example. A specific architecture of the terminal device is not limited in this application. For specific descriptions of a software system of another architecture, refer to a conventional technology.

An application program layer may include a series of application program packages, for example, application programs such as a camera, a gallery, a calendar, a call, a map, navigation, a WLAN, the Bluetooth, music, a video, an SMS message, and a launcher. For ease of description, an application program is briefly described as an application below. An application on a first device may be a native application (for example, an application installed on the first device when an operating system is installed on the first device before the first device is delivered from a factory), or may be a third-party application (for example, an application downloaded and installed by a user by using an application store). This is not limited in this embodiment of this application.

An application program framework layer provides an application programming interface (API) and a programming framework for an application program at the application program layer. As shown in FIG. 13, the application program framework layer may include a window manager service (WMS), an input event manager service (IMS), an advertisement SDK, a storage module, and a data obtaining module. For specific functions of the advertisement SDK, the storage module, and the data obtaining module, refer to the foregoing descriptions. Details are not described herein again. The application program framework layer further includes a functional function that needs to be called by FWK and that is included in the Android system or HarmonyOS system when the Android system or HarmonyOS system is running, an Android core library, and an Android virtual machine. A system library may include a plurality of functional modules, for example, a browser kernel, three-dimensional (3D) graphics, and a font library. The system library may include a plurality of functional modules, for example, a surface manager, a media library, a three-dimensional graphics processing library (for example, OpenGL ES), and a 2D graphics engine (for example, SGL).

A kernel layer is a layer between hardware and software. The kernel layer may include a display driver, an input/output device driver (for example, a keyboard, a touchscreen, a headset, a loudspeaker, or a microphone), a device node, a camera driver, an audio driver, a sensor driver, and the like. A user performs an input operation by using an input device. The kernel layer may generate a corresponding original input event based on the input operation, and store the original input event in the device node. The input/output device driver can detect an input event of the user. For example, the user starts an application.

The IMS may be configured to perform processing such as translation and encapsulation on the original input event, to obtain an input event including more information, and send the input event to the WMS. The WMS stores a tappable area (for example, a control) of each application program, location information of a focus window, and the like. Therefore, the WMS can correctly distribute the input event to a specified control or focus window. The WMS carries data and an attribute related to an "interface", and is configured to manage a status related to the "interface", for example, is configured to manage a window program and dispatch an event. Managing a window program refers to sequentially outputting a display request of an application program to a physical screen or another display device under assistance of an application server and the WMS.

In this embodiment of this application, in a process in which the terminal device requests an advertisement from the server, an input/output device driver or a sensor driver of the terminal device may detect an input event of the user. For example, the input event may be an input event in which the user taps a button on an interface to display a next-level interface of the interface, or the user performs voice input or a user-defined gesture, or another sensed input event. The input/output device driver or sensor driver of the terminal device reports the input event of the user to the IMS, and the IMS distributes the input event to a corresponding application. The application invokes the advertisement SDK, and the advertisement SDK obtains a user behavior data parameter and/or a terminal device parameter by using the data obtaining module. The advertisement SDK sends an advertisement request to the server and obtains corresponding advertisement-related information (such as an advertisement ID and an advertisement link). If a locally preloaded advertisement is invoked, the advertisement SDK invokes the storage module to obtain the preloaded advertisement. After obtaining an advertisement material, the advertisement SDK invokes a WMS interface, and the WMS invokes the display driver again to display an advertisement on the terminal device.

In some other embodiments, after obtaining the advertisement material, the advertisement SDK may return the advertisement material to the application program layer, and may be applied to some native advertisements, for example, an advertisement displayed on a minus 1 screen of the terminal. The application program invokes the WMS interface, and the WMS re-invokes the display driver, to display an advertisement on the terminal device.

It should be further understood that parameter code in the foregoing embodiments is merely an example, and should not be construed as any limitation on a format of the parameter code carried in the information in embodiments of this application. In some other embodiments of this application, the parameter code format carried in the information in embodiments of this application may alternatively be another format or the like. This is not limited herein in embodiments of this application.

It should be further understood that division into the manners, cases, categories, and embodiments in embodiments of this application is merely intended for ease of description, and should not constitute a particular limitation. The features in the manners, categories, cases, and embodiments may be combined without contradiction.

It should be further understood that numerals used in embodiments of this application are differentiated merely for ease of description, but are not used to limit the scope of embodiments of this application. The sequence numbers of the foregoing processes do not mean execution sequences. The execution sequences of the processes should be determined according to functions and internal logic of the processes, and should not be construed as any limitation on the implementation processes of embodiments of this application.

It should be further understood that the foregoing descriptions of embodiments of this application emphasize differences between the embodiments. For same or similar parts that are not mentioned, mutual reference may be made. For brevity, details are not described herein again.

It should also be understood that in embodiments of this application, "pre-defining" may be implemented by prestoring a corresponding code or a table in the device, or in another manner that can indicate relevant information, and a specific implementation thereof is not limited in this application.

The communication apparatus, the computer-readable storage medium, the computer program product, or the chip provided in embodiments is configured to perform the corresponding method provided above. Therefore, for beneficial effects that can be achieved by the communication apparatus, the computer-readable storage medium, the computer program product, or the chip, refer to the beneficial effects of the corresponding method provided above. Details are not described herein again.

In an optional manner, when software is used for implementing data transmission, the data transmission may be completely or partially implemented in a form of a computer program product. The computer program product includes one or more computer instructions. When the computer program instructions are loaded and executed on a computer, the procedures or functions in embodiments of this application are completely or partially implemented. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (DSL)) or a wireless manner (for example, infrared, radio, and microwave, or the like). The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid state disk (SSD)), or the like.

It may be understood that the memory in embodiments of this application may be a volatile memory or a nonvolatile memory, or may include a volatile memory and a nonvolatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM, and serves as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, names may be assigned to various objects such as messages/information/devices/network elements/systems/apparatuses/actions/operations/procedures/concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. In other words, the electronic device is presented in a form of a functional module. The "module" herein may be an application-specific integrated circuit ASIC, a circuit, a processor that executes one or more software or firmware programs and a memory, an integrated logic circuit, and/or another component that can provide the foregoing functions.

All or some of the methods in embodiments of this application may be implemented by software, hardware, firmware, or any combination thereof. When software is used to implement the methods, all or a part of the methods may be implemented in a form of a computer program product. The computer program product includes one or more computer programs and instructions. When the computer programs or instructions are loaded and executed on a computer, the procedures or functions in embodiments of this application are completely or partially executed. The computer may be a general-purpose computer, a dedicated computer, a computer network, or other programmable apparatuses. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a readable storage medium, and includes several instructions for instructing a computer device (which may be a personal computer, a server, or a network device) to perform all or some of the steps of the methods described in embodiments of this application. The foregoing readable storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

sending, by a terminal device, an advertisement request to an advertisement server, wherein the advertisement request indicates a first advertisement information set, the first advertisement information set comprises one or more pieces of first advertisement information, a plurality of advertisements corresponding to the first advertisement information are preloaded by the terminal device, and the one or more pieces of the first advertisement information indicated by the advertisement request comprise a plurality of cached advertisement identifiers identifying the plurality of advertisements preloaded by the terminal device;

receiving a return message from the advertisement server in response to the advertisement request, wherein the return message comprises second advertisement information, a second advertisement corresponding to the second advertisement information is not preloaded by the terminal device, and the return message further includes a spare indicator indicating a first advertisement selected by the advertisement server from the plurality of advertisements preloaded by the terminal device as a spare advertisement;

while downloading the second advertisement, determining whether a measured time of the second advertisement being downloaded is within a preset time, wherein the determining whether the measured time is within the preset time comprises:

starting time when the terminal device sends the advertisement request, and determining, while the second advertisement is being downloaded, whether an elapsed time measured has reached the preset time; and displaying the second advertisement, without displaying the first advertisement of the plurality of advertisements before the displaying the second advertisement, based on that the measured time of the second advertisement being downloaded is within the preset time; or displaying the first advertisement indicated by the return message, without displaying the second advertisement after the displaying the first advertisement, based on that the measured time of the second advertisement being downloaded is not within the preset time.

2. The method according to claim 1, wherein the method further comprises:

before the sending the advertisement request:

sending an advertisement preloading request to the advertisement server;

receiving a second return message from the advertisement server, wherein the second return message indicates a second advertisement information set, the second advertisement needs to be preloaded in the terminal device, and there are one or more second advertisements; and downloading a third advertisement based on third advertisement information.

3. The method according to claim 2, wherein the advertisement preloading request and the advertisement request each comprise one or more of: a preloading identifier, an advertisement slot identifier, a device identifier, a user identifier, or user behavior data.

4. The method according to claim 1, wherein the method further comprises:

sending a second advertisement request to the advertisement server, wherein the second advertisement request indicates the first advertisement information set, the first advertisement information set comprises one or more first advertisements, and the first advertisement is preloaded by the terminal device;

receiving a third return message from the advertisement server in response to the second advertisement request, wherein the third return message comprises the first advertisement information; and displaying a first advertisement material corresponding to the first advertisement.

5. The method according to claim 1, wherein the return message comprises one or more of: an advertisement material download link, an advertisement identifier, an advertisement name, a package name of an application program, or address information of the terminal device.

6. The method according to claim 1, wherein the terminal device sends the advertisement request to the advertisement server by invoking an advertisement software development kit (SDK).

7. The method according to claim 1, wherein the method further comprises:

before the sending, the advertisement request to the advertisement server:

obtaining a first operation of a user, wherein the first operation is of opening an application program or of tapping a link in the application program.

8. The method according to claim 2, wherein the method further comprises:

before the downloading the third advertisement based on the third advertisement information, determining to connect to a network through wireless fidelity (Wi-Fi).

9. A non-transitory computer-readable storage medium, wherein the non-transitory computer-readable storage medium stores a computer program, the computer program comprises program instructions that, when the program instructions are executed by a terminal device, cause the terminal device to perform operations including:

sending an advertisement request to an advertisement server, wherein the advertisement request indicates a first advertisement information set, the first advertisement information set comprises one or more pieces of first advertisement information, a plurality of advertisements corresponding to the first advertisement information are preloaded by the terminal device, and the one or more pieces of the first advertisement information indicated by the advertisement request comprise a plurality of cached advertisement identifiers identifying the plurality of advertisements preloaded by the terminal device;

receiving a return message from the advertisement server in response to the advertisement request, wherein the return message comprises second advertisement information, and a second advertisement corresponding to the second advertisement information is not preloaded by the terminal device, and the return message further includes a spare indicator indicating a first advertisement selected by the advertisement server from the plurality of advertisements preloaded by the terminal device as a spare advertisement;

while downloading the second advertisement, determining whether a measured time of the second advertisement being downloaded is within a preset time, wherein the determining whether the measured time is within the preset time comprises:

starting time when the terminal device sends the advertisement request, and determining, while the second advertisement is being downloaded, whether an elapsed time measured has reached the preset time; and displaying the second advertisement, without displaying the first advertisement of the plurality of advertisements before the displaying the second advertisement, based on that the measured time of the second advertisement being downloaded is within the preset time; or displaying the first advertisement indicated by the return message, without displaying the second advertisement after the displaying the first advertisement, based on that the measured time of the second advertisement being downloaded is not within the preset time.

10. The non-transitory computer-readable storage medium according to claim 9, the operations further comprising:

before the sending the advertisement request:

sending an advertisement preloading request to the advertisement server;

receiving a second return message from the advertisement server, wherein the second return message indicates a second advertisement information set, the second advertisement needs to be preloaded in the terminal device, and there are one or more second advertisements; and downloading a third advertisement based on third advertisement information.

11. The non-transitory computer-readable storage medium according to claim 10, wherein the advertisement preloading request and the advertisement request each comprise one or more of: a preloading identifier, an advertisement slot identifier, a device identifier, a user identifier, or user behavior data.

12. The non-transitory computer-readable storage medium according to claim 9, wherein the operations further comprise:

sending a second advertisement request to the advertisement server, wherein the second advertisement request indicates the first advertisement information set, the first advertisement information set comprises one or more first advertisements, and the first advertisement is preloaded by the terminal device;

receiving a third return message from the advertisement server in response to the second advertisement request, wherein the third return message comprises the first advertisement information; and displaying a first advertisement material corresponding to the first advertisement.

13. The non-transitory computer-readable storage medium according to claim 9, wherein the return message comprises one or more of: an advertisement material download link, an advertisement identifier, an advertisement name, a package name of an application program, or address information of the terminal device.

14. The non-transitory computer-readable storage medium according to claim 9, wherein the terminal device sends the advertisement request to the advertisement server by invoking an advertisement software development kit (SDK).

15. An apparatus comprising:

at least one processor; and a non-transitory computer readable storage medium storing programming, the programming including instructions that, when executed by the at least one processor, cause the apparatus to perform operations including:

sending an advertisement request to an advertisement server, wherein the advertisement request indicates a first advertisement information set, the first advertisement information set comprises one or more pieces of first advertisement information, a plurality of advertisements corresponding to the first advertisement information are preloaded by a terminal device, the one or more pieces of the first advertisement information indicated by the advertisement request comprise a plurality of cached advertisement identifiers identifying the plurality of advertisements preloaded by the terminal device, and the apparatus is the terminal device or a chip on the terminal device;

receiving a return message from the advertisement server in response to the advertisement request, wherein the return message comprises second advertisement information, a second advertisement corresponding to the second advertisement information is not preloaded by the terminal device, and the return message further includes a spare indicator indicating a first advertisement selected by the advertisement server from the plurality of advertisements preloaded by the terminal device as a spare advertisement;

while downloading the second advertisement, determining whether a measured time of the second advertisement being downloaded is within a preset time, wherein the determining whether the measured time is within the preset time comprises:

starting time when the terminal device sends the advertisement request, and determining, while the second advertisement is being downloaded, whether an elapsed time measured has reached the preset time; and displaying the second advertisement, without displaying the first advertisement of the plurality of advertisements before the displaying the second advertisement, based on that the measured time of the second advertisement being downloaded is within the preset time; or displaying the first advertisement indicated by the return message, without displaying the second advertisement after the displaying the first advertisement, based on that the measured time of the second advertisement being downloaded is not within the preset time.

16. The apparatus according to claim 15, the operations further comprising:

before the sending the advertisement request:

sending an advertisement preloading request to the advertisement server;

receiving a second return message from the advertisement server, wherein the second return message indicates a second advertisement information set, the second advertisement needs to be preloaded in the terminal device, and there are one or more second advertisements; and downloading a third advertisement based on third advertisement information.

17. The apparatus according to claim 16, wherein the advertisement preloading request and the advertisement request each comprise one or more of: a preloading identifier, an advertisement slot identifier, a device identifier, a user identifier, or user behavior data.

18. The apparatus according to claim 15, the operations further comprising:

sending a second advertisement request to the advertisement server, wherein the second advertisement request indicates the first advertisement information set, the first advertisement information set comprises one or more first advertisements, and the first advertisement is preloaded by the terminal device;

receiving a third return message from the advertisement server in response to the second advertisement request, wherein the third return message comprises the first advertisement information; and displaying a first advertisement material corresponding to the first advertisement.

* * * * *